(12) United States Patent
Krug

(10) Patent No.: US 12,017,708 B2
(45) Date of Patent: Jun. 25, 2024

(54) BREAKAWAY FIFTH WHEEL COUPLING

(71) Applicant: Axicle, Inc., Redondo Beach, CA (US)

(72) Inventor: Stephen Leo Krug, Redondo Beach, CA (US)

(73) Assignee: Axicle, Inc., Redondo Beach, CA (US)

( * ) Notice: Subject to any disclaimer, the term of this patent is extended or adjusted under 35 U.S.C. 154(b) by 456 days.

(21) Appl. No.: 17/490,927

(22) Filed: Sep. 30, 2021

(65) Prior Publication Data

US 2022/0097783 A1     Mar. 31, 2022

Related U.S. Application Data

(60) Provisional application No. 63/185,887, filed on May 7, 2021, provisional application No. 63/085,235, filed on Sep. 30, 2020.

(51) Int. Cl.
*B62D 53/08* (2006.01)
*B60D 1/64* (2006.01)
*B62D 53/10* (2006.01)

(52) U.S. Cl.
CPC ........... *B62D 53/0871* (2013.01); *B60D 1/64* (2013.01); *B62D 53/0835* (2013.01); *B62D 53/0885* (2013.01); *B62D 53/10* (2013.01)

(58) Field of Classification Search
CPC .......................... B62D 53/08; B62D 53/0871; B62D 53/0835; B62D 53/0885; B62D 53/10; B60D 1/243; B60D 1/244; B60D 1/64
USPC ................................. 280/432, 443, 449, 451
See application file for complete search history.

(56) References Cited

U.S. PATENT DOCUMENTS

| | | | |
|---|---|---|---|
| 2,815,224 | A | 12/1957 | Waters |
| 3,951,435 | A | 4/1976 | Greatbach |
| 4,079,959 | A | 3/1978 | Vance |
| 4,199,168 | A | 4/1980 | Bush et al. |
| 4,269,426 | A | 5/1981 | Bhushan |
| 4,444,408 | A | 4/1984 | Goth |
| 6,145,864 | A | 11/2000 | Sutherland |

(Continued)

FOREIGN PATENT DOCUMENTS

| | | | | |
|---|---|---|---|---|
| WO | 2015187083 A1 | 12/2015 | | |
| WO | WO-2015187083 A1 * | 12/2015 | ............. | B62D 53/08 |
| WO | 2021013495 A1 | 1/2021 | | |

OTHER PUBLICATIONS

International Search Report and Written Opinion conveying a favorable finding of novelty, inventive step, and industrial applicability in related International Application No. PCT/US2021/059280, dated Feb. 11, 2022.

*Primary Examiner* — Minnah L Seoh
*Assistant Examiner* — Christopher B Wehrly
(74) *Attorney, Agent, or Firm* — Nicholas J. Boyarski

(57) ABSTRACT

A breakaway fifth wheel coupling may couple a semi-tractor to a semi-trailer. In one embodiment, a breakaway fifth wheel coupling may include a top plate, a bottom brace, and a release mechanism that releasably attaches the top plate to the bottom brace. When a rollover event is detected, the release mechanism may allow the top plate to release from the bottom brace, thereby allowing the semi-tractor to separate from the semi-trailer. The fifth wheel coupling may include a pair of pivot rails that promote consistent decoupling of the top plate from the bottom brace. The breakaway fifth wheel coupling may reduce the likelihood of the semi-tractor participating in a rollover accident.

20 Claims, 21 Drawing Sheets

(56) References Cited

U.S. PATENT DOCUMENTS

| | | |
|---|---|---|
| 6,308,977 B1 | 10/2001 | Pulliam et al. |
| 7,264,259 B2 | 9/2007 | Lindenman et al. |
| 7,469,918 B2 | 12/2008 | Kaleta |
| 7,731,216 B2 | 6/2010 | Cornish |
| 8,820,768 B2 | 9/2014 | Grizzle |
| 10,093,366 B2 | 10/2018 | Penkov |
| 10,661,621 B2 | 5/2020 | Zerba et al. |
| 2007/0205578 A1 | 9/2007 | Cornish |
| 2009/0184492 A1 | 7/2009 | Teichrob et al. |
| 2017/0137077 A1 | 5/2017 | McCoy et al. |
| 2019/0359018 A1 | 11/2019 | Brickley et al. |

\* cited by examiner

100

Prior Art

105

Prior Art

Prior Art

BREAKAWAY FIFTH WHEEL COUPLING

CROSS REFERENCE

This application claims the benefit of U.S. Provisional Patent Application No. 63/085,235, filed on Sep. 30, 2020, and U.S. Provisional Patent Application No. 63/185,887, filed on May 7, 2021. The disclosures of the applications referenced herein are incorporated by reference in their entirety.

FIELD

This disclosure relates to breakaway fifth wheel couplings for semi-trucks. This disclosure also relates to methods and apparatuses for preventing rollover accidents, improving semi-trailer coupling, and improving semi-truck aerodynamics.

BACKGROUND

The trucking industry suffers thousands of injuries every year due to rollover accidents of semi-tractors. Injuries range in severity from non-incapacitating injuries to fatal injuries. Insurance payouts associated with semi-tractor rollover accidents exceed three billion dollars annually. There is a need for an improved safety device that can decrease the number of rollover accidents and protect lives and property.

BRIEF SUMMARY

Figure 1:
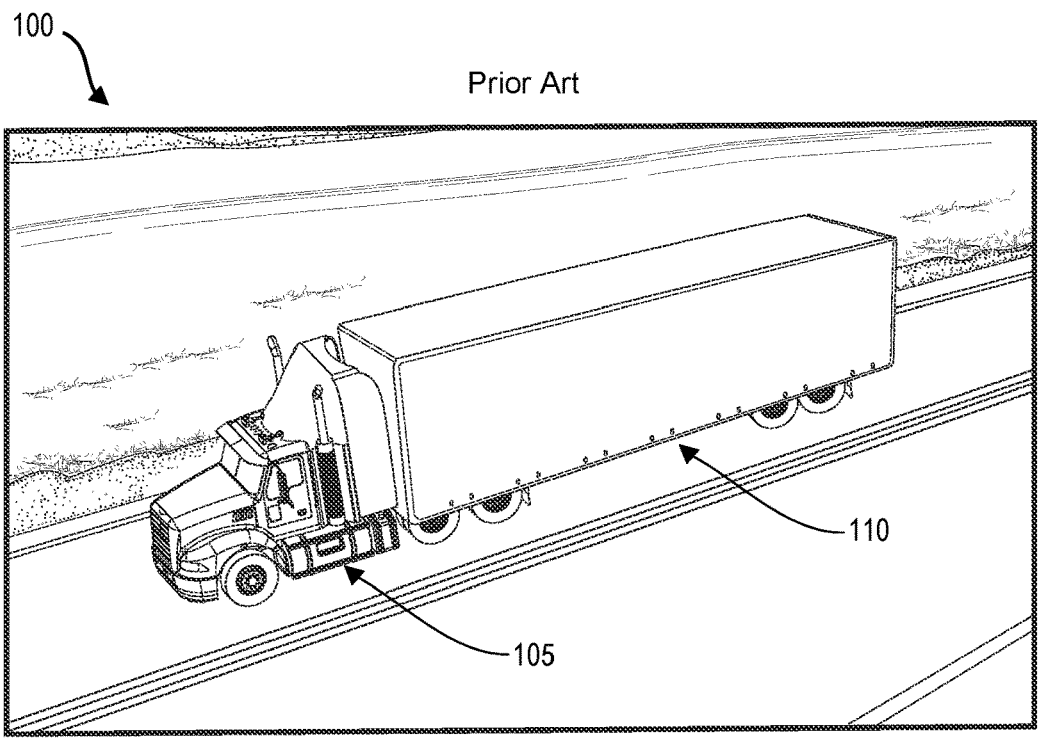
FIG. 1 shows a semi-truck with a conventional fifth wheel coupling operating on a roadway with a substantial crosswind.

A semi-tractor-trailer truck ("semi-truck") includes a semi-tractor ("tractor") and a semi-trailer ("trailer") to transport freight, as shown in FIG. 1. The trailer attaches to the tractor through a hitch, known as a fifth wheel coupling ("fifth wheel").

Most semi-truck rollovers are caused by crosswinds, collision, driver error, or a combination thereof. The trailer is often less resistant to rolling over than a tractor because it has a higher center of gravity. Consequently, during a rollover event, the trailer may begin rolling first and, since the trailer is mechanically coupled to the tractor by the fifth wheel coupling, the rolling trailer may encourage the tractor to roll over as well.

A breakaway fifth wheel coupling, as described herein, is configured to decouple the tractor from the trailer during a rollover event. When the trailer is initiating a rollover, a portion of the fifth wheel coupling may rapidly break away (i.e., release) from a portion of the fifth wheel coupling that remains attached to the tractor, thereby effectively decoupling the tractor from the trailer. By decoupling the tractor from the trailer, the trailer is allowed to roll over without causing the tractor to roll over, thereby protecting the driver from injury or death and protecting the tractor from physical damage.

The breakaway fifth wheel coupling may be passive or actively-controlled. In an actively-controlled embodiment, the breakaway fifth wheel coupling may be equipped with an electronic control system that detects an onset of a trailer rollover event based on inputs from one or more sensors and automatically decouples the tractor from the trailer, thereby improving the likelihood of the driver retaining control of the tractor and preventing its rollover. In a passive embodiment, forces resulting from the onset of the trailer rollover event may actuate a mechanism that decouples the tractor from the trailer.

In some instances, it may be desirable to bring the trailer to a controlled stop before fully releasing it from the tractor. For example, during a trailer rollover event on a busy roadway, the breakaway fifth wheel coupling may allow the trailer to partially decouple from the tractor. The tractor may then slow or come to a controlled stop before the coupling fully breaks away and allows the tractor to fully separate from the trailer. The tractor may then move a safe distance away from the rolled trailer.

DETAILED DESCRIPTION

Figure 2:
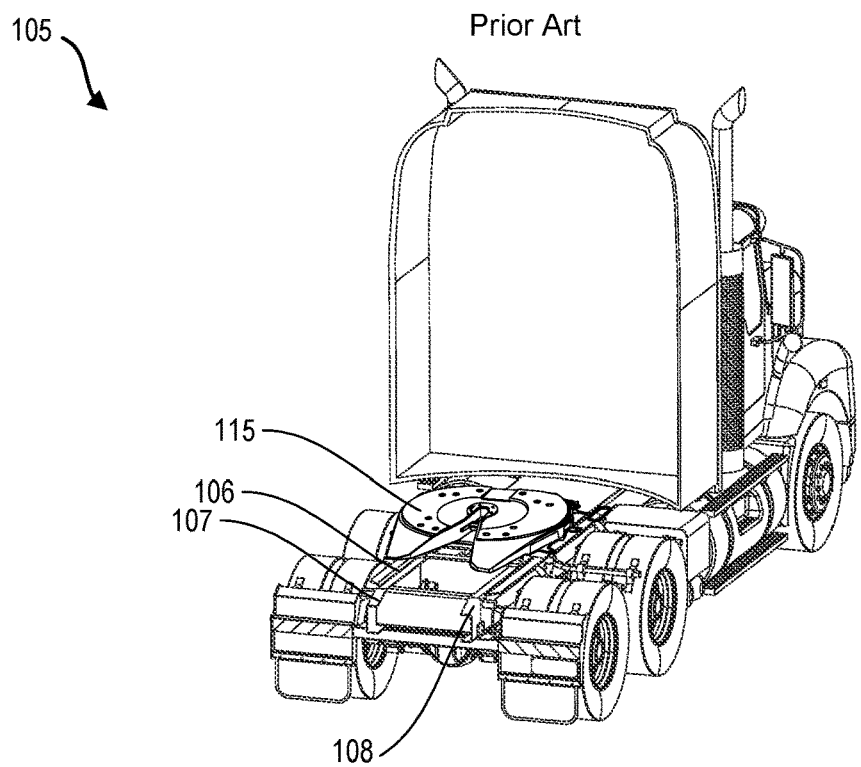
FIG. 2 shows a semi-tractor with a conventional fifth wheel coupling mounted to a chassis of the tractor.
Figure 3:
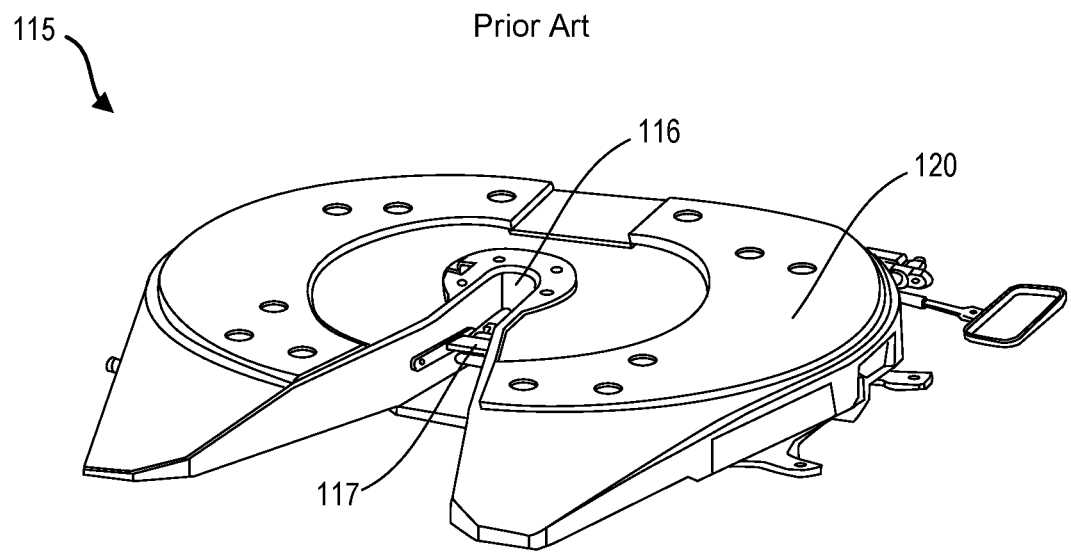
FIG. 3 shows the conventional fifth wheel coupling.

A conventional fifth wheel coupling 115 is shown in FIG. 3. The conventional fifth wheel coupling 115 mounts to a chassis 106 of a tractor 105, as shown in FIG. 2. The fifth wheel coupling 115 allows the tractor 105 to be coupled to a trailer 110, as shown in FIG. 1. More specifically, the fifth wheel coupling 115 allows the tractor 105 to be coupled to a king pin 112 of the trailer 110. During coupling, the king pin of the trailer 110 is inserted into a throat opening 116 of the fifth wheel coupling 115 and captured by a latching mechanism 117. A skid plate 111 of the trailer 110 is supported by the top plate of the fifth wheel coupling. Lubricant is provided between the top plate 120 and the skid plate 111 to facilitate smooth rotation about the king pin 112.

Figure 4:
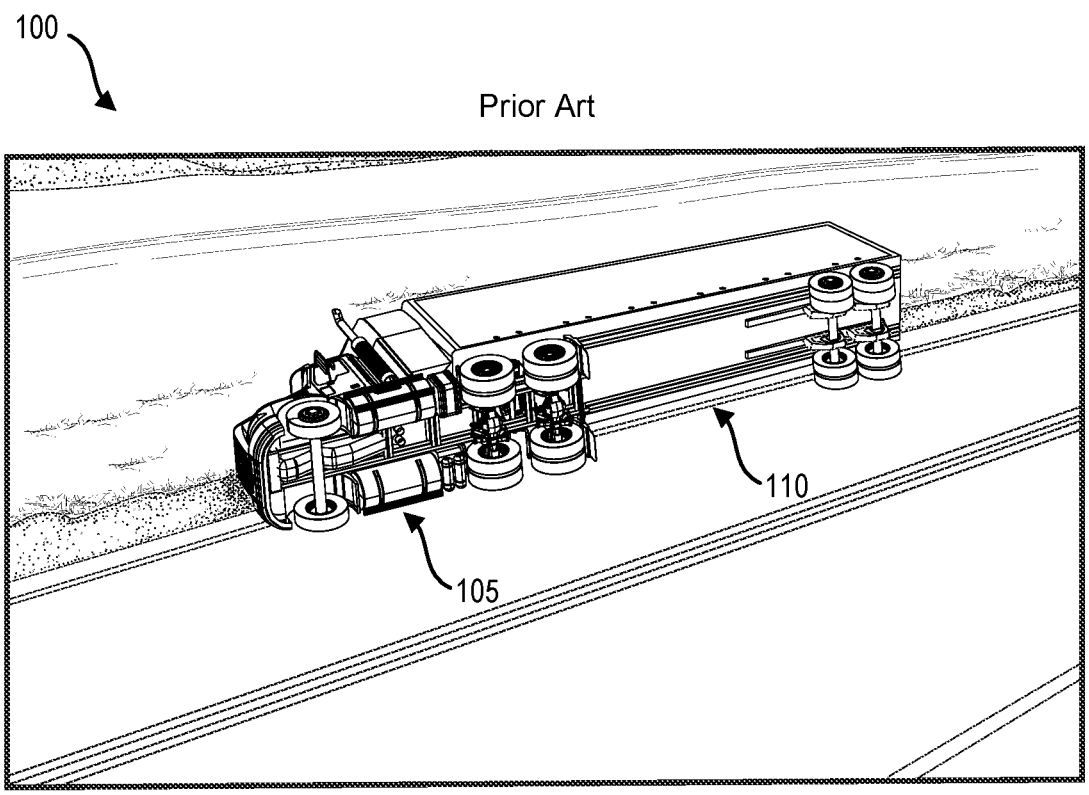
FIG. 4 shows the semi-truck of FIG. 1 after a rollover accident.
Figure 5:
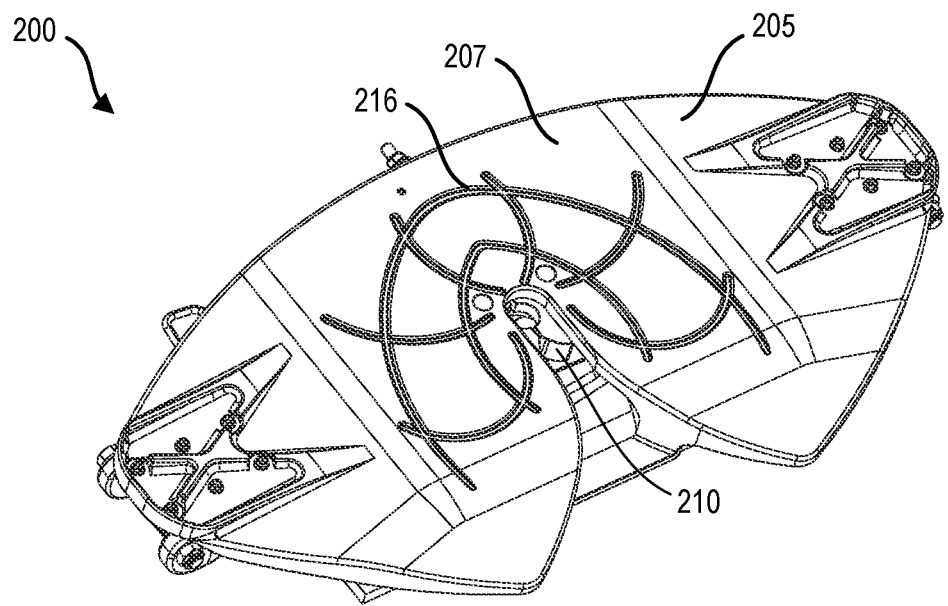
FIG. 5 shows a top perspective of a breakaway fifth wheel coupling.

FIG. 1 shows the semi-truck 100 operating on a roadway with a substantial crosswind. If the crosswind is strong enough to cause the trailer 110 to roll over, the rolling trailer 110 may cause the tractor 105 to roll over as well, as shown in FIG. 4, due to the mechanical coupling provided by the conventional fifth wheel 115. If the tractor 105 rolls over, the conventional fifth wheel coupling 115 dramatically increases the likelihood of the driver being injured or killed and increases the amount of physical damage to the tractor.

To prevent the tractor 105 from rolling over when the trailer 110 rolls over, in certain situations, it may be desirable to rapidly release the trailer 110 from the tractor 105 when an onset of a trailer rollover event is detected. Rapidly decoupling the trailer 110 from the tractor 105 may be achieved by several examples of breakaway fifth wheel couplings described herein.

A first example of a breakaway fifth wheel coupling 200 ("coupling" or "fifth wheel") is shown in FIGS. 5-25. The coupling 200 may combine features of the conventional fifth wheel coupling 115 shown in FIG. 3 with one or more novel safety features that improve trailer coupling and decoupling and prevent tractor 105 rollover during a trailer rollover event. The breakaway fifth wheel coupling 200 may have a dual pivot rail configuration to promote consistent and predictable performance during a trailer rollover event.

The breakaway fifth wheel coupling 200 may include a top plate 205, as shown in FIGS. 5-16, 18, and 25. The top plate 205 may have a top side 206 and a bottom side 208. The top plate 205 may have a top surface 207 and a bottom surface 209. The top surface 207 may be configured to support a trailer skid plate 111. The top surface 207 may have a plurality of grooves configured to receive a lubricant, such as grease.

Figure 9:
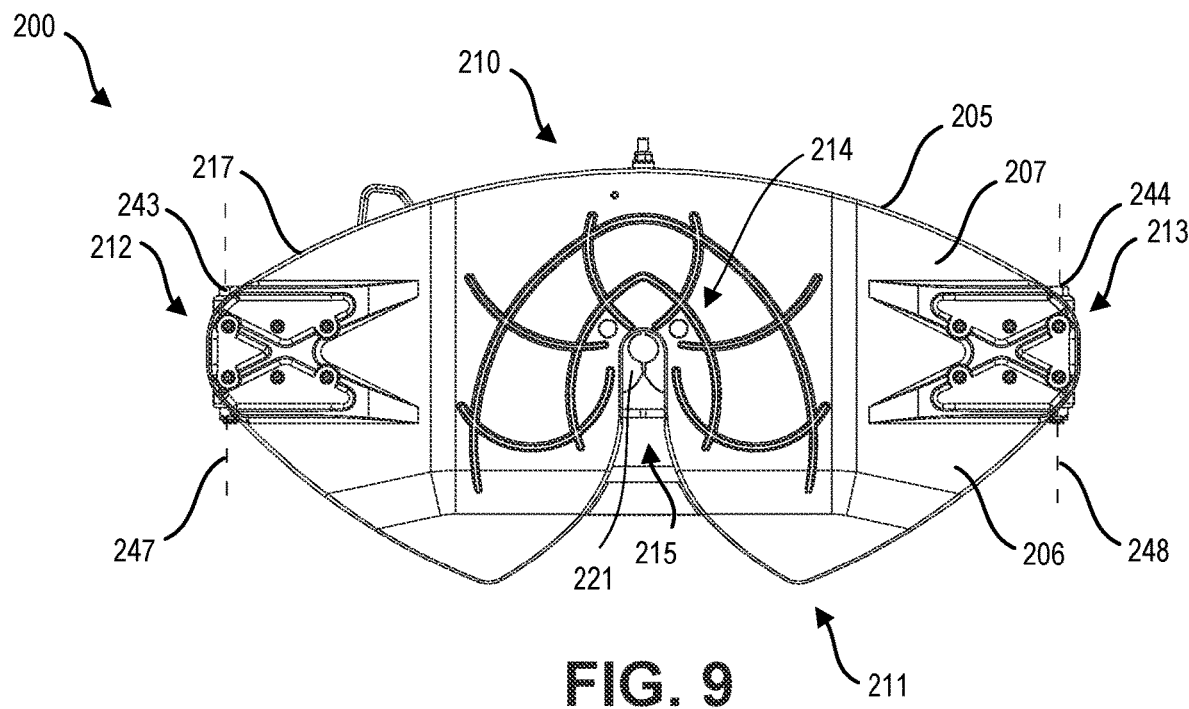
FIG. 9 shows a top view of the breakaway fifth wheel coupling of FIG. 5.

As shown in FIG. 9, the top plate 205 may have a front portion 210, a rear portion 211, a central portion 214, a left side portion 212, and a right side portion 213. The central portion 214 may be located between the front portion 210 and the rear portion 211. The central portion 214 may be located between the left side portion 212 and the right side portion 213. The top surface 207 may be configured to receive lubricant. The top plate 205 may be configured to support the trailer skid plate 111 when the trailer 110 is loaded with freight. The top plate 205 may have a central throat opening 215 extending from the rear portion 211 toward the central portion 214, as shown in FIG. 9. The central throat opening 215 may be configured to receive the trailer king pin 112 extending downward from the trailer skid plate 111. A king pin latching mechanism 220 may be configured to retain the trailer king pin 112 within the throat opening 215.

Figure 10:
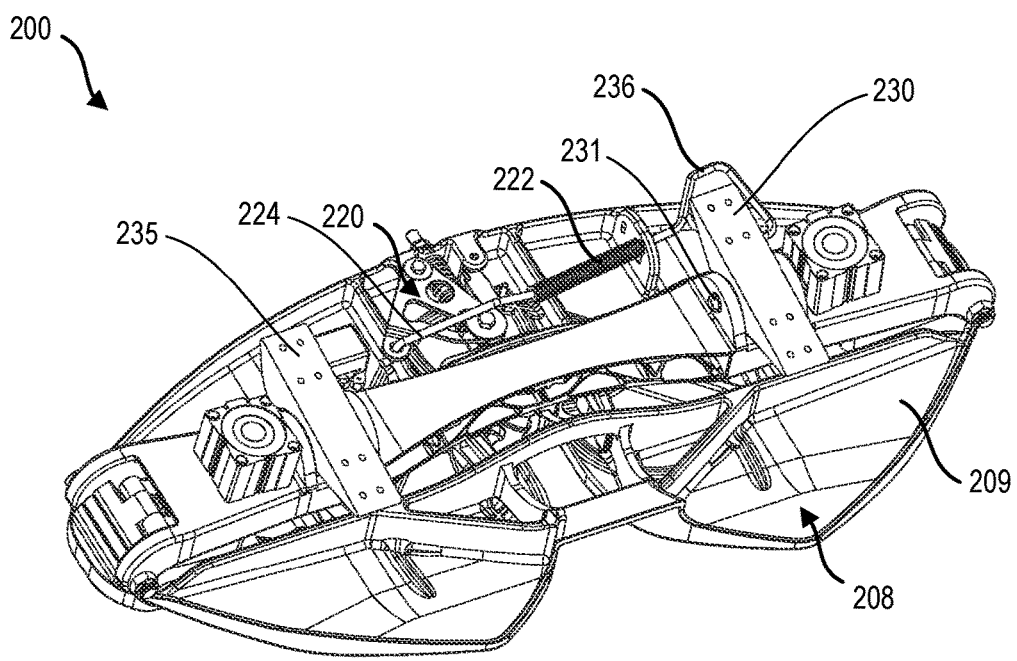
FIG. 10 shows a bottom perspective view of the breakaway fifth wheel coupling of FIG. 5.
Figure 11:
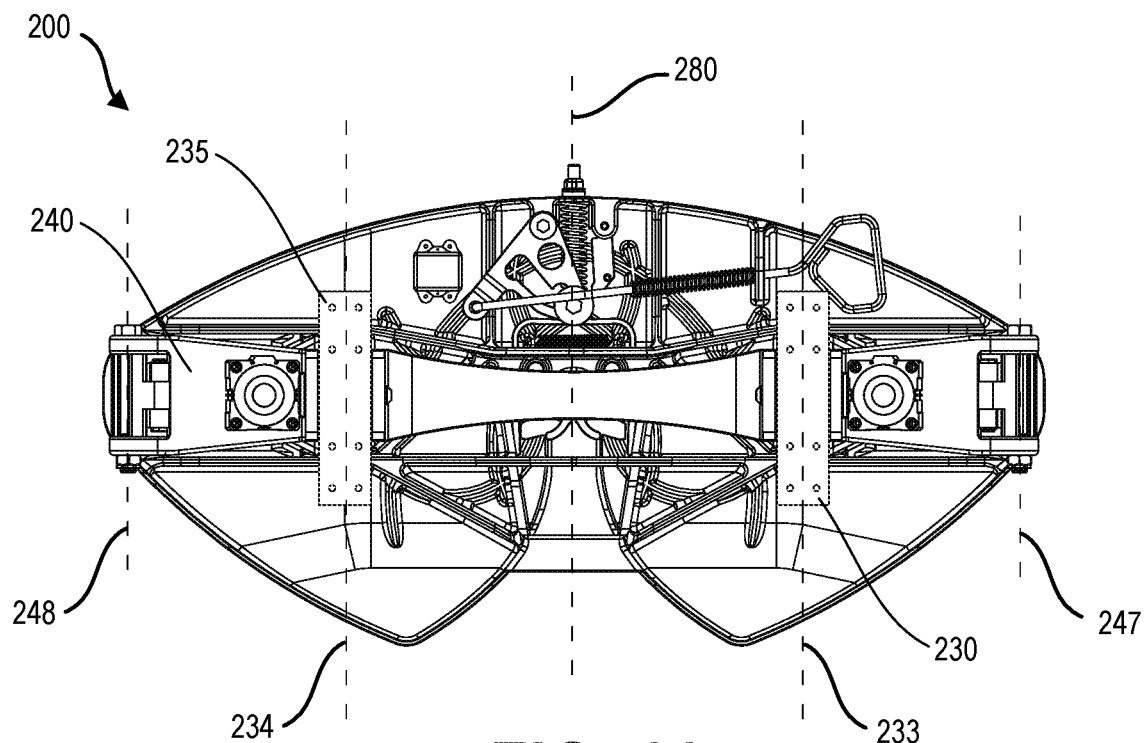
FIG. 11 shows a bottom view of the breakaway fifth wheel coupling of FIG. 5.

An example of the king pin latching mechanism 220 is shown in FIGS. 9 and 10. The king pin latching mechanism 220 may be located near the central throat opening 215 and be configured to receive and secure the trailer king pin 112. The king pin latching mechanism 220 may include a lock jaw 221, a tension spring 222, a lock bar, a release arm 224, and a release handle 236. The lock jaw 221 may be located within the throat opening 215 of the top plate 205 and secure the king pin 112 during coupling.

Figure 7:
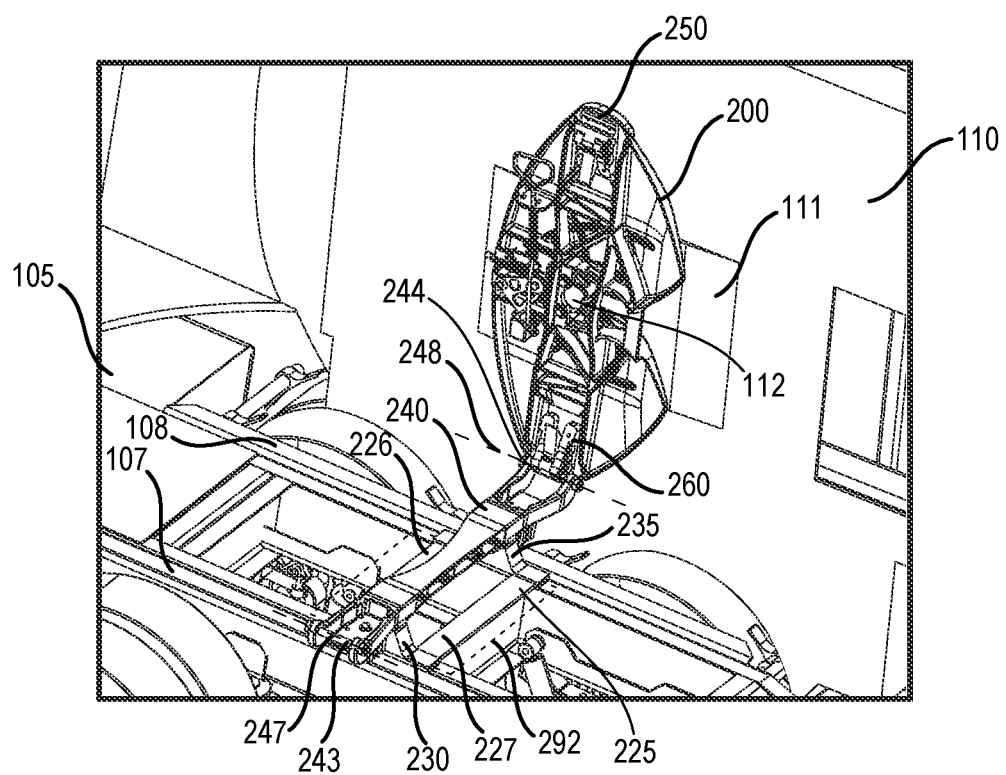
FIG. 7 shows an enlarged view of the breakaway fifth wheel coupling of FIG. 5 during the rollover event.
Figure 17:
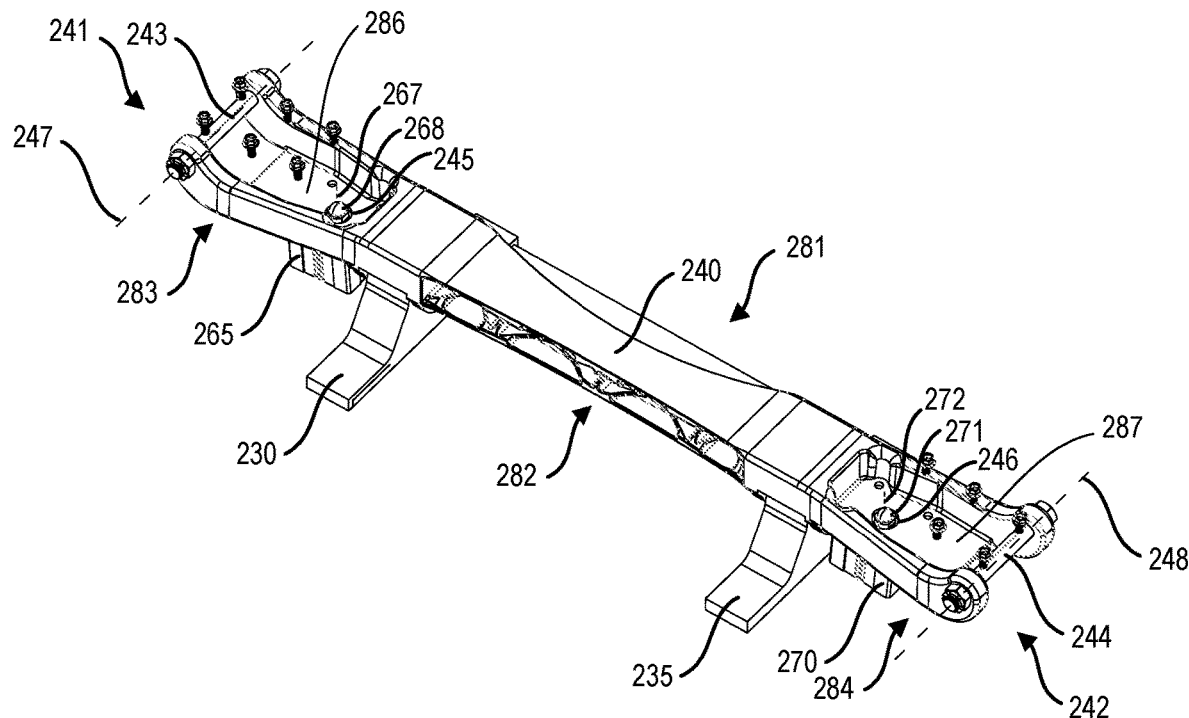
FIG. 17 shows a top perspective view of the bottom brace and the mounting brackets of FIG. 5 and fasteners for the first and second release mechanisms.
Figure 18:
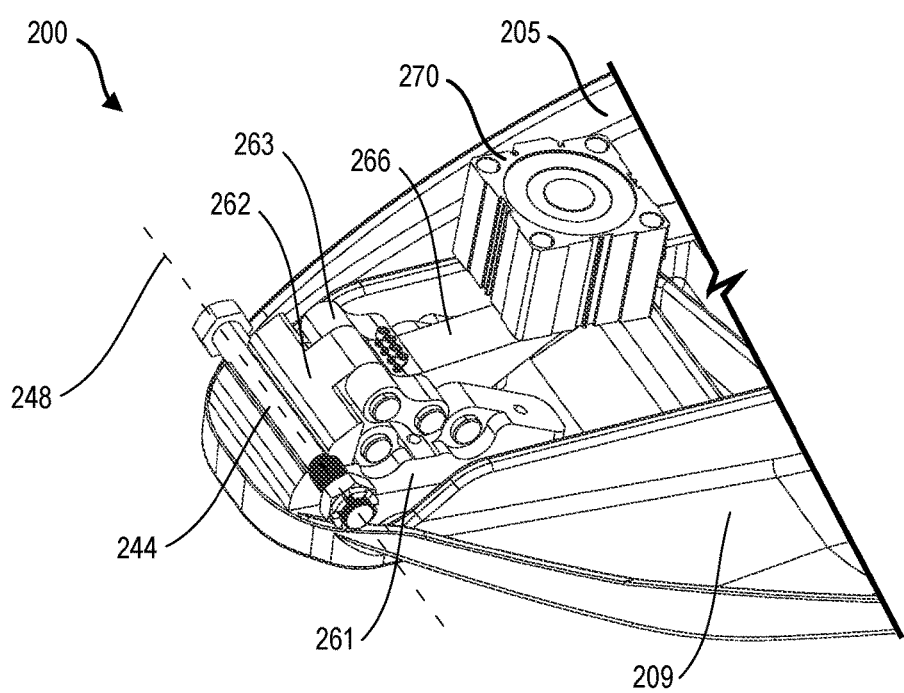
FIG. 18 shows a partial bottom perspective view of the breakaway fifth wheel coupling of FIG. 5 with the bottom brace removed to reveal the relationship between the release mechanism and the actuator and the relationship between the release mechanism and the pivot rail.

The breakaway fifth wheel coupling 200 may include a mounting assembly suitable for attaching the coupling 200 to a tractor chassis. A mounting plane 292 may be formed where the mounting assembly meets the tractor chassis 106, as shown in FIG. 7. The mounting assembly may include a first mounting bracket 230 and a second mounting bracket 235, as shown in FIGS. 10 and 17. The first and second mounting brackets may be pedestal mounts that mount on top of a left chassis rail 107 and a right chassis rail 108 of the tractor chassis 106, respectively, to elevate the top plate 205 above the mounting plane 292.

Figure 25:
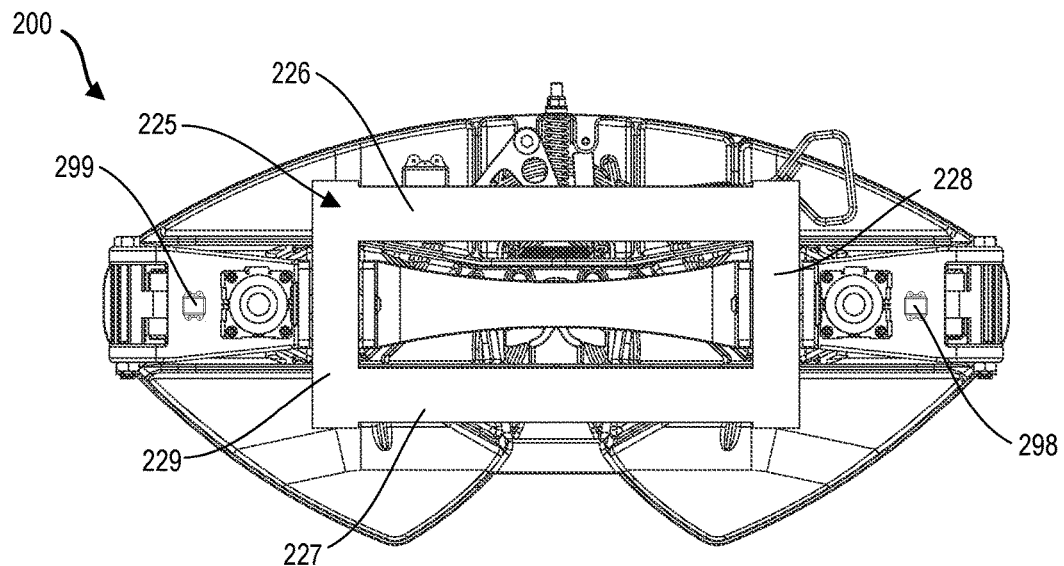
FIG. 25 shows a bottom view of the breakaway fifth wheel coupling of FIG. 5 attached to a mounting frame.

In some examples, the mounting assembly may include a mounting frame 225, as shown in FIG. 25. The mounting frame 225 that may be configured to securely mount the breakaway fifth wheel coupling 200 to a tractor chassis 106 and provide additional stabilization and lateral support. The mounting frame 225 may be mounted to the tractor chassis 106, as shown in FIG. 7. The mounting frame 225 may have a rectangular frame. The mounting frame 225 may have one or more cross members that extend from the left chassis rail 107 to the right chassis rail 108. The mounting frame 225 having a front member 226, a rear member 227, a left side member 228, and a right side member 229, as shown in FIG. 25. The front member 226 may extend from the left chassis rail 107 to the right chassis rail 108. The rear member 227 may extend from the left chassis rail 107 to the right chassis rail 108. The left side member 228 may extend from the front member 226 to the rear member 227 along the left chassis rail 107. The right side member 229 may extend from the front member 226 to the rear member 227 along the right chassis rail 108.

The first mounting bracket 230 and the second mounting bracket 235 may mount directly to the tractor chassis 106. Alternately, the first mounting bracket 230 and the second mounting bracket 235 may mount to the mounting frame 225, which mounts to the tractor chassis 106. The first mounting bracket 230 may mount to the left side member 228 of the mounting frame 225, and the second mounting bracket 235 may mount to the right side member 229 of the mounting frame 225. The first and second mounting brackets may be stationary or sliding mounting brackets. The first and second mounting brackets may be pedestal mounting brackets.

The breakaway fifth wheel coupling 200 may include a bottom brace 240. FIG. 17 shows an example bottom brace 240 mounted to the first mounting bracket 230 and the second mounting bracket 235. The bottom brace 240 may have a first end 241 and a second end 242 opposite the first end. The bottom brace 240 may have a front portion 281 and a rear portion 282. The bottom brace 240 may have a left side portion 283 and a right side portion 284. The bottom brace 240 may serve as a structural support for the top plate 205. The bottom brace 240 may serve as a structural cross member that distributes a trailer load equally between the left chassis rail 107 and the right chassis rail 108. The bottom brace 240 may extend from the first mounting bracket 230 to the second mounting bracket 235. The first end 241 of the bottom brace 240 may extend leftward beyond the first mounting bracket 230. Similarly, the second end 242 of the bottom brace 240 may extend rightward beyond the mounting bracket 235.

Figure 12:
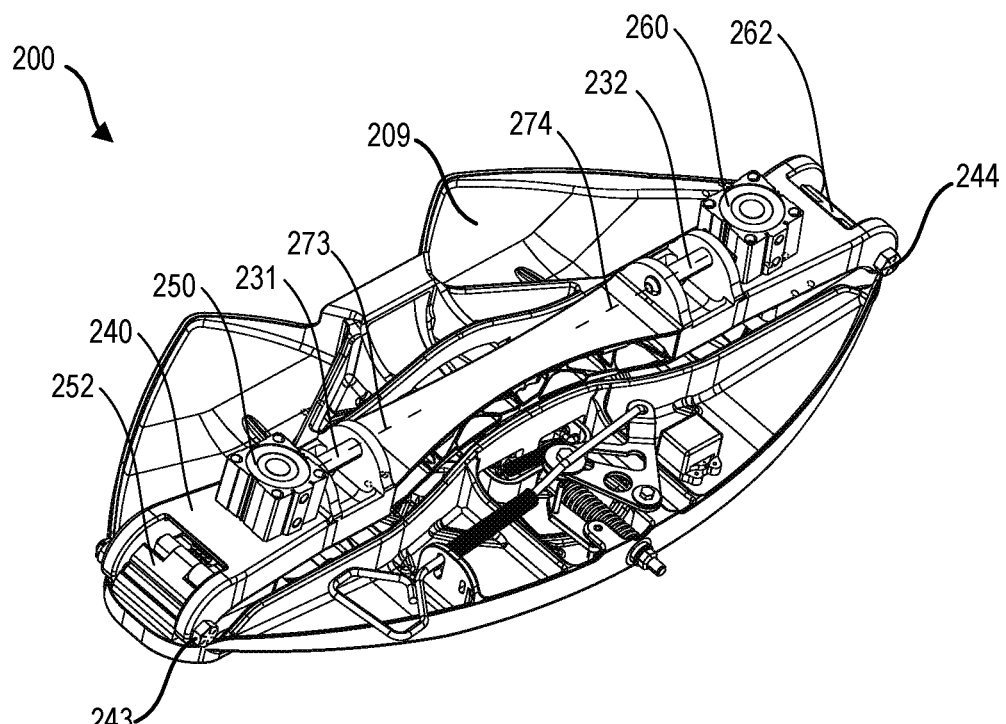
FIG. 12 shows a bottom perspective view of the breakaway fifth wheel coupling of FIG. 5 with the mounting brackets removed.
Figure 13:
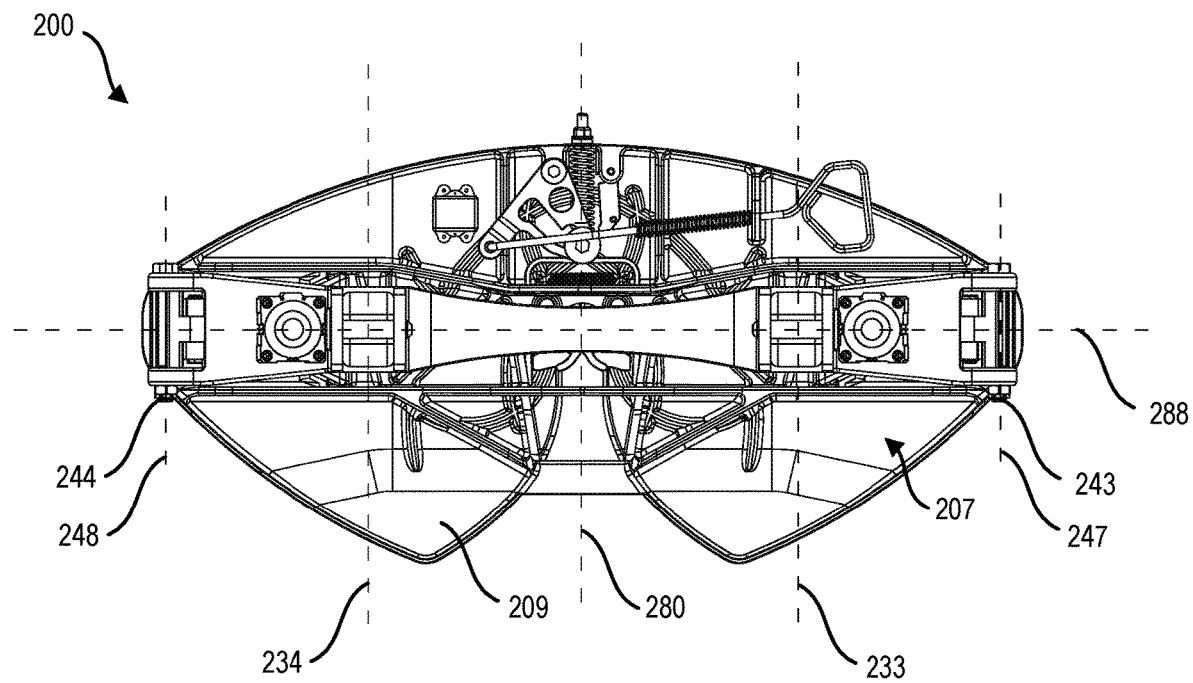
FIG. 13 shows a bottom view of the breakaway fifth wheel coupling of FIG. 5 with the mounting brackets removed.
Figure 14:
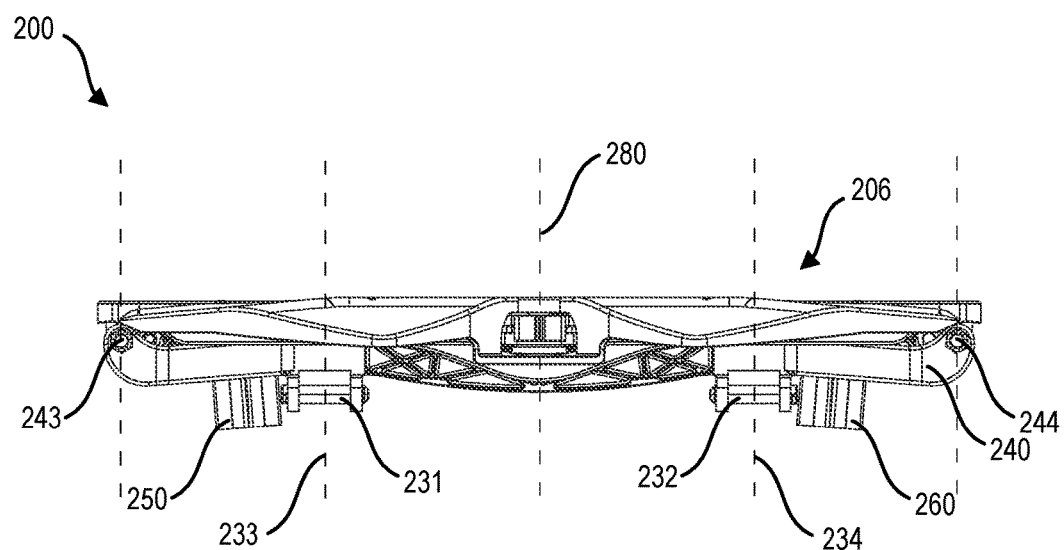
FIG. 14 shows a rear view of the breakaway fifth wheel coupling of FIG. 5 with the mounting brackets removed.

The bottom brace 240 may be joined to the first mounting bracket 230 by a first pivot joint 231, as shown in FIG. 10. The bottom brace may be joined to the mounting bracket 235 by a second pivot joint 232. The first pivot joint 231 may have a first pivot axis 273, as shown in FIG. 12. The second pivot joint 232 may have a second pivot axis 274. Examples of the first and second pivot joints are shown in FIG. 12. A first vertical plane 233 may intersect the first pivot joint 231, and a second vertical plane 234 may intersect the second pivot joint 232, as shown in FIG. 13. A third vertical plane 288 may intersect the first pivot joint 231 and the second pivot joint 232, as shown in FIG. 13. The first and second pivot joints may allow the bottom brace 240 and the top plate 205 to rock forward and backward relative to the mounting brackets to accommodate movement of the trailer skid plate 111 relative to the tractor 105 during transit.

Figure 15:
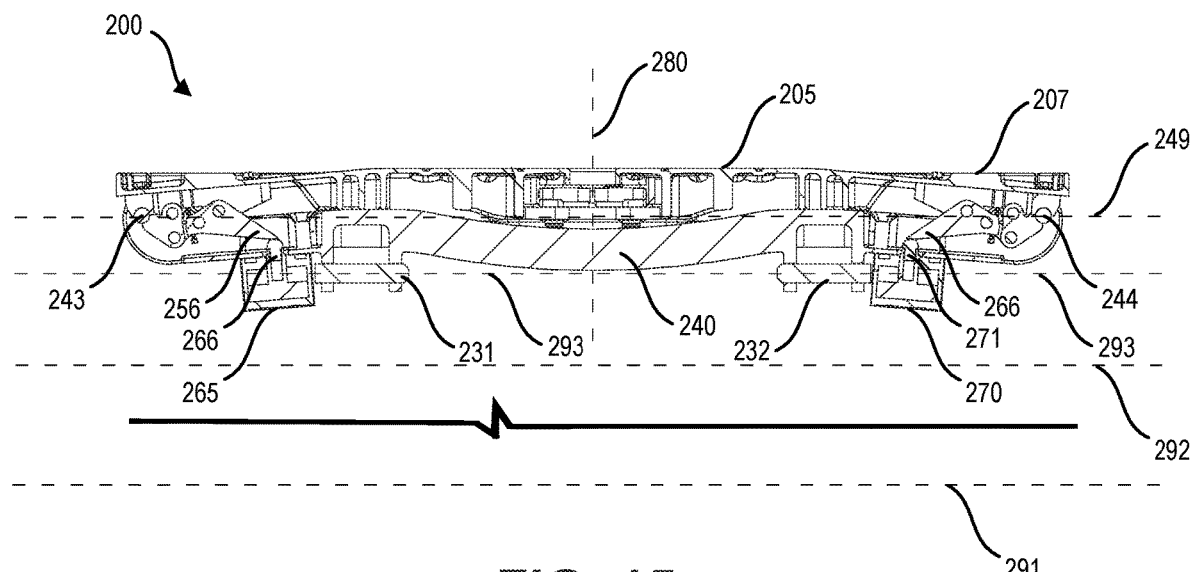
FIG. 15 shows a cross-sectional rear view of the breakaway fifth wheel coupling of FIG. 5 with the mounting brackets removed.

The bottom brace 240 may be configured to removably attach to the top plate 205. The bottom brace 240 may include a first pivot rail 243 at or proximate to the first end 241. The bottom brace 240 may include a second pivot rail 244 at or proximate to the second end 242. The first pivot rail 243 may extend in a front-to-rear direction of the bottom brace 240. The second pivot rail 244 may extend in a front-to-rear direction of the bottom brace 240. A first pivot axis 247 of the first pivot rail 243 may be substantially parallel to a second pivot axis 248 of the second pivot rail 244, as shown in FIGS. 13 and 17. The first pivot axis 247 and the second pivot axis 248 may be located in a horizontal plane 249 that is parallel to and above the mounting plane 292, as shown in FIG. 15. The horizontal plane 249 may be parallel to and above a ground plane 291. The horizontal plane 249 may be parallel to and above a second horizontal plane 293 that intersects the first pivot joint 231 and the second pivot joint 232.

It may be desirable to position the first pivot axis 247 and the second pivot axis 248 relatively high in the breakaway fifth wheel coupling 200 to improve release performance of the coupling 200. In one example, a minimum distance between the top surface 207 of the top plate 205 and the first pivot axis 247 may be less than 25% of a minimum distance between the top surface 207 of the top plate 205 and a mounting plane 292, as shown in FIG. 15. In another example, a minimum distance between the top surface 207 of the top plate 205 and the first pivot axis 247 may be less than 10% of a minimum distance between the top surface 207 of the top plate 205 and a mounting plane 292. Minimizing the distance between a top surface 207 of the top plate 205 and the horizontal plane 249 that contains the first pivot axis 247 and the second pivot axis 248 may improve release performance by promoting a consistent pivoting motion about the first or second pivot axis.

It may be desirable to position the first pivot axis 247 and the second pivot axis 248 relatively far apart in the breakaway fifth wheel coupling 200 to improve release performance of the coupling 200. In one example, the distance between the first pivot axis 247 and the second pivot axis 248 may be at least 75% of a maximum width of the top plate 205. In another example, the distance between the first pivot axis 247 and the second pivot axis 248 may be at least 75% of a maximum width of the top plate 205. As shown in FIG. 9, the first pivot rail 243 and the second pivot rail 244 may extend partially beyond a perimeter 217 of the top plate 205, effectively maximizing the distance between the first and second pivot rails. The first pivot rail 243 and the second pivot rail 244 may be positioned farther apart than the first mounting bracket 230 and the second mounting bracket 235.

The breakaway fifth wheel coupling 200 may include a first release mechanism 250. An example of the first release mechanism 250 is shown in a closed position (i.e., clamped position) in FIGS. 19 and 20 and in an open position (i.e., unclamped position) in FIG. 21. The first release mechanism 250 may be mounted to the top plate 205. The first release mechanism 250 may be mounted (e.g., fastened with bolts) to the bottom surface 209 of the top plate 205. The first release mechanism 250 may be configured to clamp onto the first pivot rail 243. When the top plate 205 is attached to the bottom brace 240, the first release mechanism 250 may reside at least partially in a first pocket 286 in the top surface of the bottom brace 240. The first pocket 286 is shown in FIG. 17.

Figure 19:
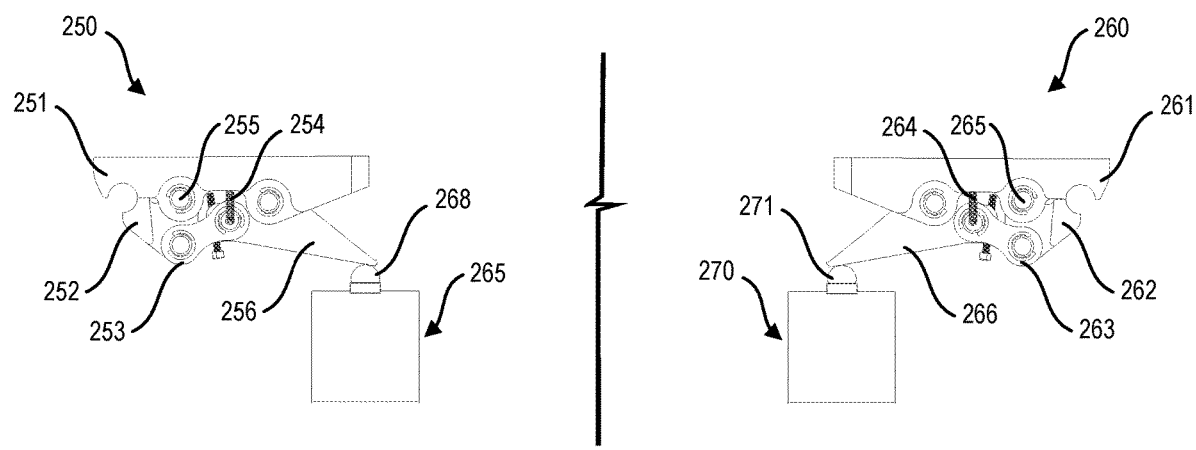
FIG. 19 shows a side view of a first actuator, a first release mechanism, a second actuator, and a second release mechanism of the breakaway fifth wheel coupling of FIG. 5.
Figure 20:
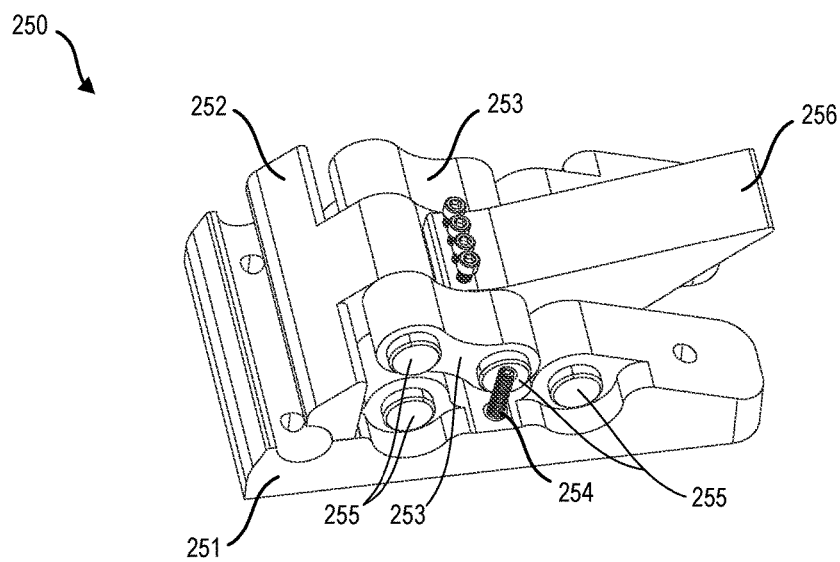
FIG. 20 shows a bottom perspective view of the first release mechanism of the breakaway fifth wheel coupling of FIG. 5 in a clamped position.
Figure 21:
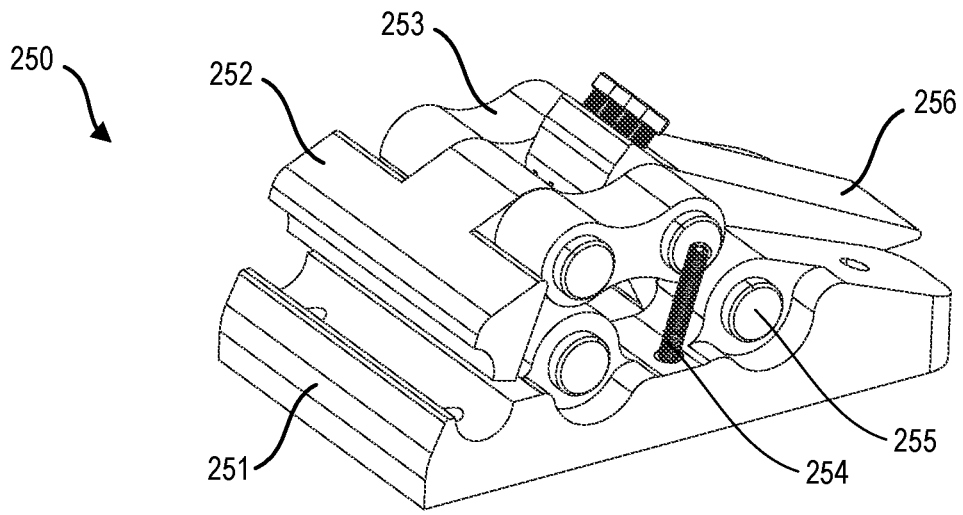
FIG. 21 shows a bottom perspective view of the release mechanism of FIG. 19 in an unclamped position.

The first release mechanism 250 may be an over-center linkage assembly. The first release mechanism may include a body portion 251, a clamp portion 252, one or more linkages 253, one or more springs 254, a plurality of pivot pins 255, and a first moment arm 256, as shown in FIG. 19. Depressing the first moment arm 256 may move the clamp portion 252 away from the body portion 251, thereby transitioning the first release mechanism 250 from a clamped position to an unclamped position.

Figure 22:
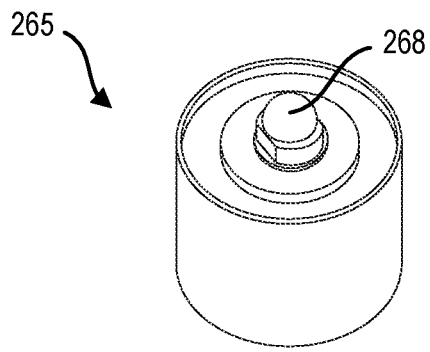
FIG. 22 shows a top perspective view of a first actuator of the breakaway fifth wheel coupling of FIG. 5 in a stowed position.
Figure 23:
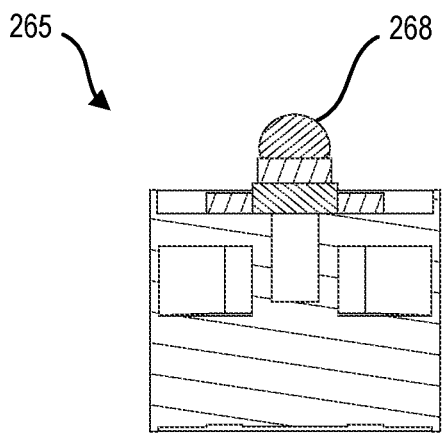
FIG. 23 shows a side cross-sectional view of the first actuator of FIG. 22 with a first piston rod in a stowed position.
Figure 24:
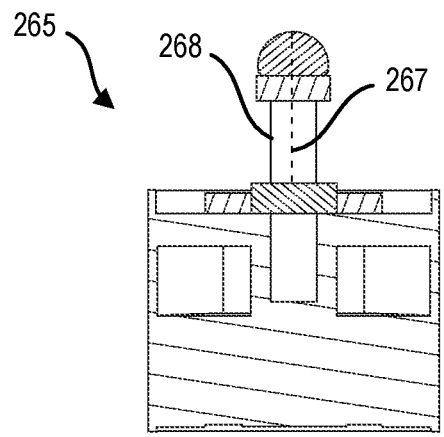
FIG. 24 shows a side cross-sectional view of the first actuator of FIG. 22 with the first piston rod in a deployed position.

The breakaway fifth wheel coupling 200 may include a first actuator 265. The first actuator 265 may be configured to transition the first release mechanism 250 from the closed position (i.e., clamped position) to the open position (i.e., unclamped), thereby releasing the first release mechanism 250 from the first pivot rail 243. An example of the first actuator 265 is shown in FIGS. 22-24. FIG. 22 shows a top perspective view of the first actuator 265. FIG. 23 shows a side cross-sectional view of the actuator with a first piston rod 268 in a stowed position. FIG. 24 shows a side cross-sectional view of the first actuator 265 with the first piston rod 268 in a deployed position. The first piston rod 268 may deploy along a first deployment pathway 267, as shown in FIGS. 17 and 24. The first deployment pathway 267 may be a linear pathway extending upward from a top surface of the first actuator 265. In one example, the first piston rod 268 may be deployed by gas pressure resulting from detonating a pyrotechnic charge. In another example, the first piston rod 268 may be deployed by hydraulic pressure. In yet another example, the first piston rod 268 may be deployed by pneumatic pressure. The first actuator 265 may be a linear actuator.

The first actuator 265 may be mounted to a bottom surface 209 of the bottom brace 240, as shown in FIG. 17. The bottom brace 240 may include an opening 245 that permits the first piston rod 268 to pass through the bottom brace 240 and contact the moment arm of the first release mechanism 250. When the first piston rod 268 is deployed, it may force the moment arm 266 down, causing the first release mechanism to unclamp from and release the first pivot rail 243.

Mounting the first actuator 265 below the bottom brace 240 and providing the first pocket 286 for the first release mechanism 250 provides a compact assembly that allows the breakaway fifth wheel coupling 200 to replace conventional couplings 115 without any need for modification during retrofitting.

Figure 16:
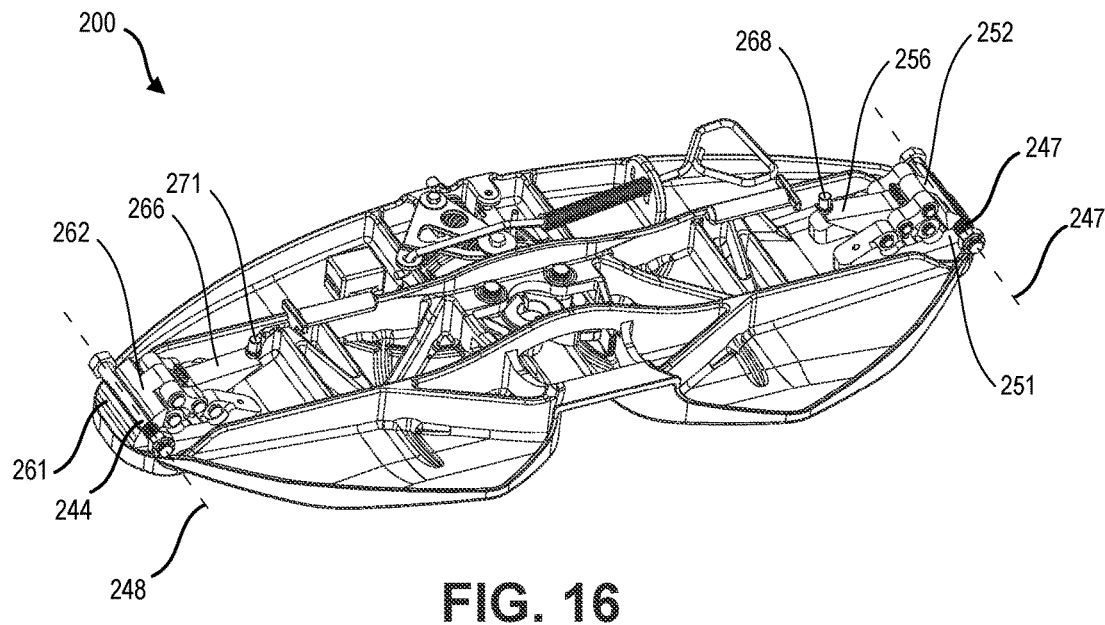
FIG. 16 shows a bottom perspective view of the breakaway fifth wheel coupling of FIG. 5 with the mounting brackets and the bottom brace removed but including the first and second pivot rails and the first and second piston rods.

The first release mechanism 250 may remain clamped onto the first pivot rail 243 during normal operation. When clamped, the first pivot rail 243 may be captured between the body portion 251 and the clamp portion 252, as shown in FIG. 16. During a trailer rollover event, the first release mechanism 250 may be configured to unclamp and release the first pivot rail 243, as shown in FIG. 7. For example, during a rollover event, the first actuator 265 may activate, and the first piston rod 268 may apply force to the first moment arm 256, causing the clamp portion 252 to open and release the first pivot rail 243.

The breakaway fifth wheel coupling 200 may include a second release mechanism 260. The second release mechanism 260 may be mounted to the top plate 205. The second release mechanism 260 may be mounted (e.g., fastened with bolts) to the bottom surface 209 of the top plate 205. The second release mechanism 260 may be configured to clamp onto the second pivot rail 244. When the top plate 205 is attached to the bottom brace 240, the second release mechanism 260 may reside at least partially in a second pocket 287 in the top surface of the bottom brace 240. The second pocket 287 is shown in FIG. 17.

The second release mechanism 260 may be constructed similarly and function similarly as the first release mechanism 250 except that it clamps and unclamps from the second pivot rail 244. The second release mechanism 260 may include a body portion 261, a clamp portion 262, one or more linkages, one or more springs, a plurality of pivot pins, and a moment arm 266.

The second release mechanism 260 may be configured to remain clamped onto the second pivot rail 244 during normal operation. When clamped, the second pivot rail 244 may be captured between the body portion 261 and the clamp portion 262. During a trailer rollover event, the second release mechanism 260 may be configured to unclamp and release the second pivot rail 244. For example, during a rollover event, the second piston rod 271 of the second actuator 270 may apply force to the second moment arm 266, causing the clamp portion 262 of the second release mechanism 260 to open and release the second pivot rail 244, thereby allowing the tractor 105 to jettison the trailer 110.

Figure 6:
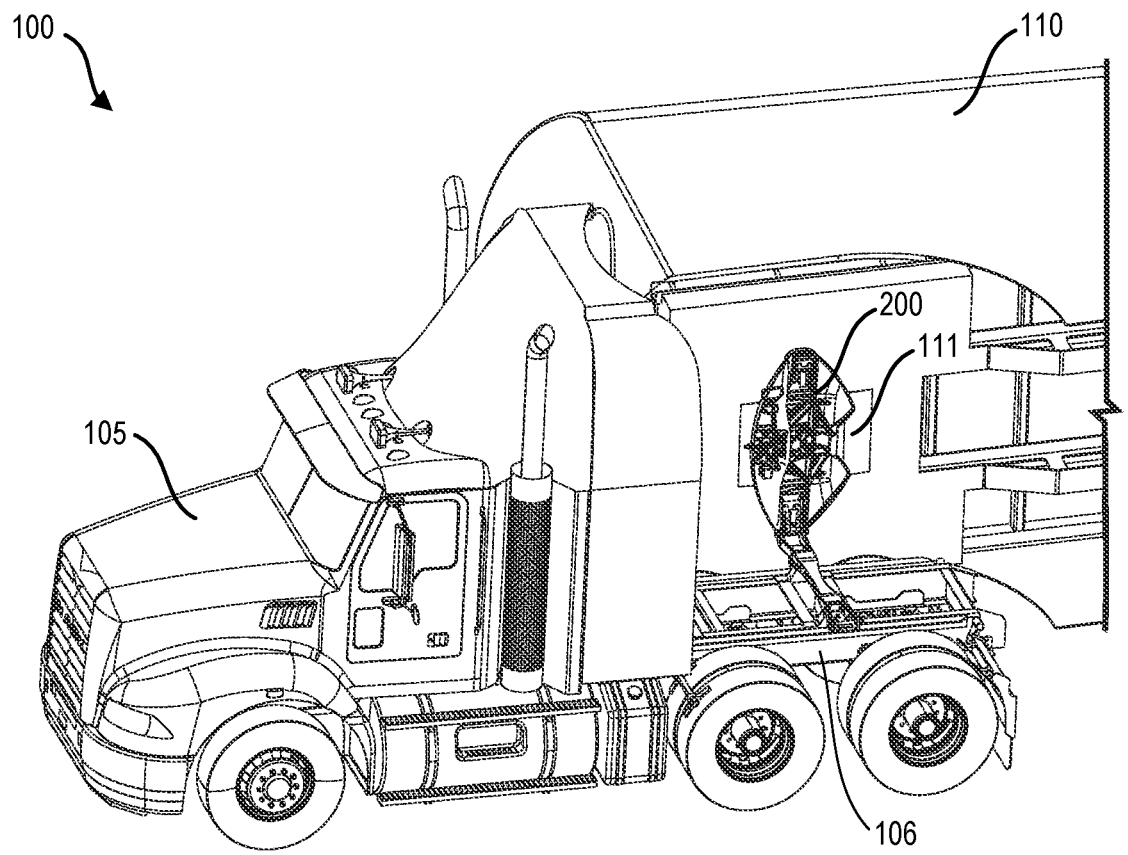
FIG. 6 shows a semi-truck with the breakaway fifth wheel coupling of FIG. 5 during a trailer rollover event.
Figure 8:
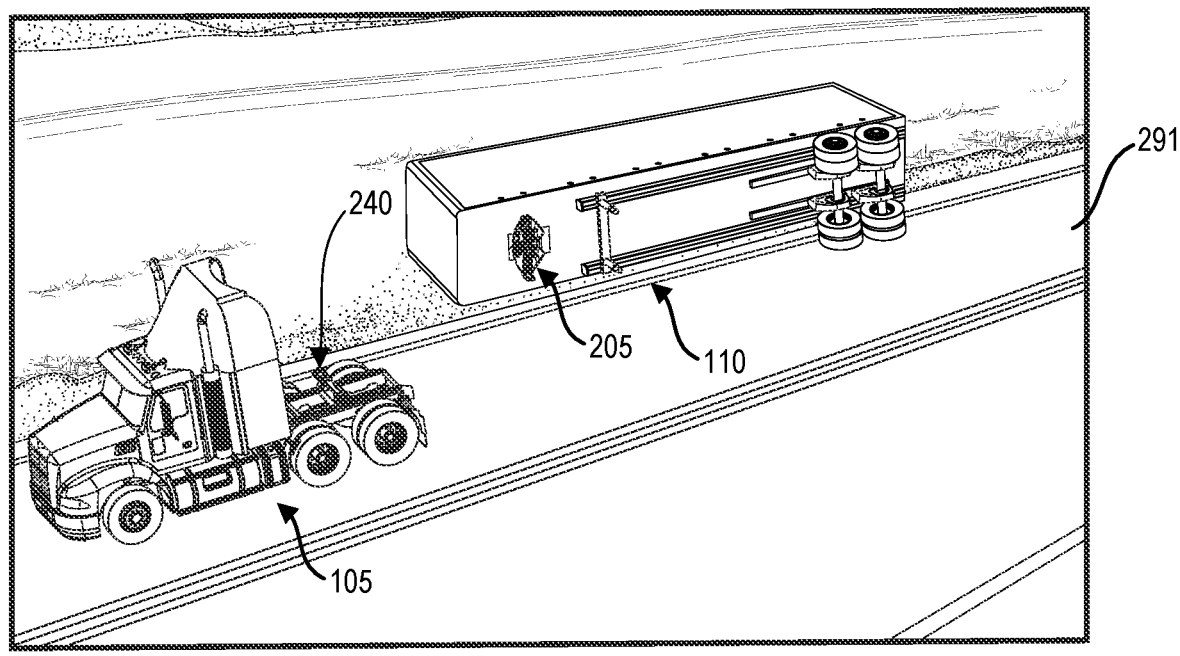
FIG. 8 shows the semi-truck of FIG. 5 after the trailer has decoupled from the tractor and rolled onto its side.

FIGS. 6 and 7 show the breakaway fifth wheel coupling 200 during a trailer rollover event. During a trailer rollover event, the top plate 205 may transition from being coupled to the bottom brace 240 to being entirely decoupled from the bottom brace 240. Prior to the rollover event, the top plate 205 is coupled to the bottom brace 240. When the trailer 110 initiates a rollover, the first release mechanism 250 lifts off of the first pivot rail 243, as shown in FIGS. 6 and 7. As the trailer 110 continues to roll, the second release mechanism 260 lifts off of the second pivot rail 244. As the trailer 110 continues to roll, the trailer 110 eventually fully separates from the tractor 105. FIG. 8 shows the trailer 110 after it has completely separated from the tractor 105, and the tractor has moved a safe distance away from the rolled trailer.

As shown in FIG. 7, when the trailer 110 rolls to the right, the top plate 205 may first release from the first pivot rail 243 and then pivot about the second pivot axis 248 before the trailer 110 is eventually jettisoned. Similarly, when the trailer 110 rolls to the left, the top plate 205 may first release from the second pivot rail 244 and then pivot about the first pivot axis 247 before the trailer 110 is eventually jettisoned. This dual pivot rail configuration may provide consistent and predictable performance regardless of whether the trailer is rolling to the left or right.

In another example (e.g., on a busy roadway), it may be desirable to bring the trailer 110 to a controlled stop before releasing it from the tractor 105. During a trailer rollover event, the top plate 205 may transition from being coupled to the bottom brace 240 to being partially decoupled from the bottom brace 240. Prior to the rollover event, the top plate 205 is coupled to the bottom brace 240. When the trailer 110 initiates a rollover, the first release mechanism 250 may lift off of the first pivot rail 243, as shown in FIGS. 6 and 7. The tractor 105 may then slow or come to a controlled stop before the second release mechanism 260 is actuated to release the second pivot rail 244, thereby allowing the top plate 205 to fully decouple from the bottom brace 240 and allowing the tractor 105 to fully separate from the trailer 110. The tractor 105 may then move a safe distance away from the rolled trailer 110, as shown in FIG. 8.

In one example, the release mechanism may be a passive release system. In another example, the release mechanism may be an active release mechanism that employs one or more sensors and is electronically controlled. In yet another example, the release mechanism may include a combination of passive and active elements.

The active release mechanism may be electronically controlled. The active release mechanism may include an electronic control unit (ECU). The one or more sensors may include, for example, an accelerometer, a strain gauge, a load cell, and/or an inertial measurement unit. The inertial measurement unit may be capable of determining roll, yaw, and/or pitch. The sensors may include redundant sensors. In one example, the sensors may be positioned on the tractor 105. In another example, the sensors may be positioned on the trailer 110. In another example, the sensors may be positioned on the tractor and the trailer. In another example, the sensors may be attached directly to the fifth wheel coupling 200. For example, a first sensor 298 may be attached to a left side portion of the fifth wheel coupling 200, and a second sensor 299 may be attached to a right side portion of the fifth wheel coupling 200. More specifically, the first sensor 298 may be attached to the left side portion of the bottom brace 240, and the second sensor may be attached to the right side portion of the bottom brace 240, as shown in FIG. 25. Comparing data collected from the first and second sensors may provide information about the state of the trailer 110 and inform a determination about whether or not to acuate one or both of the release mechanisms.

The ECU may contain control logic that receives data from the one or more sensors and determines one or more variables, such as orientation of the tractor and trailer, speed of travel, and/or state of the breakaway fifth wheel coupling. Based on the one or more determinations, the ECU may determine whether or not to trigger the first and second actuators to effectively release the top plate 205.

Figure 26:
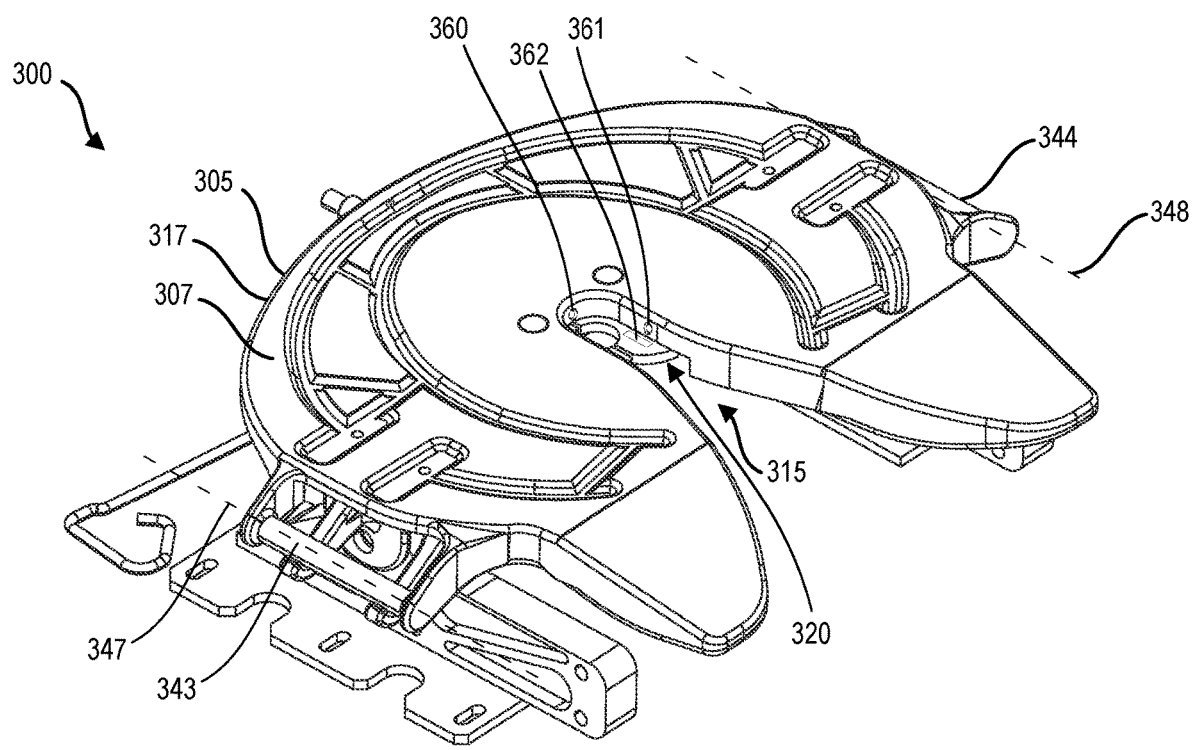
FIG. 26 shows an alternate breakaway fifth wheel coupling.
Figure 27:
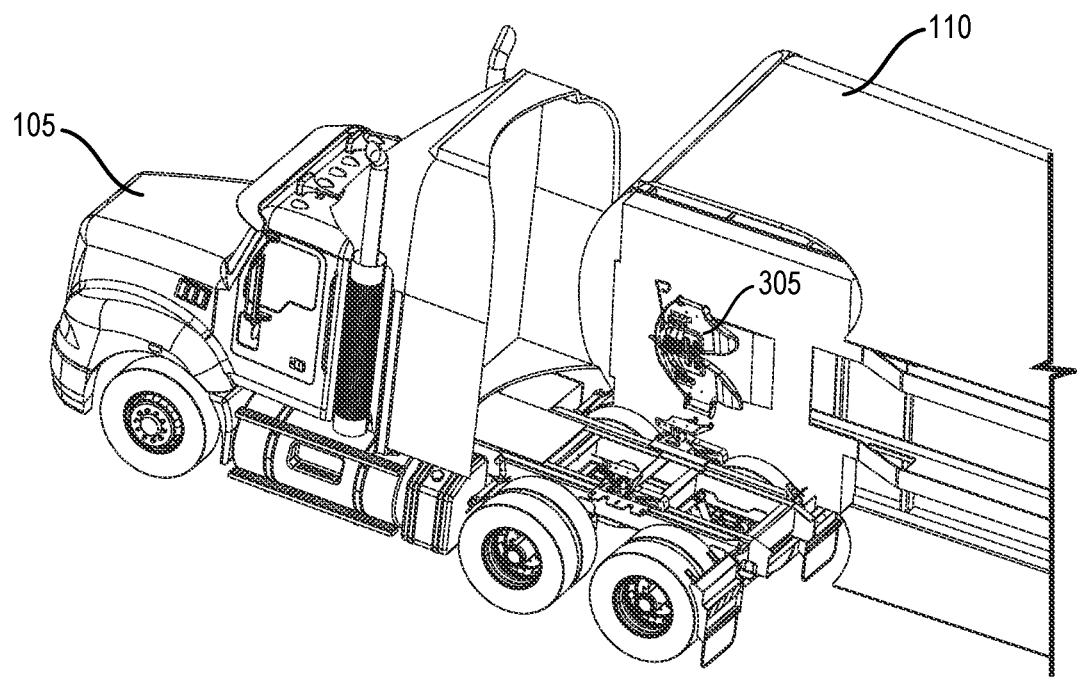
FIG. 27 shows a semi-truck with the breakaway fifth wheel coupling of FIG. 26 during a trailer rollover event.
Figure 28:
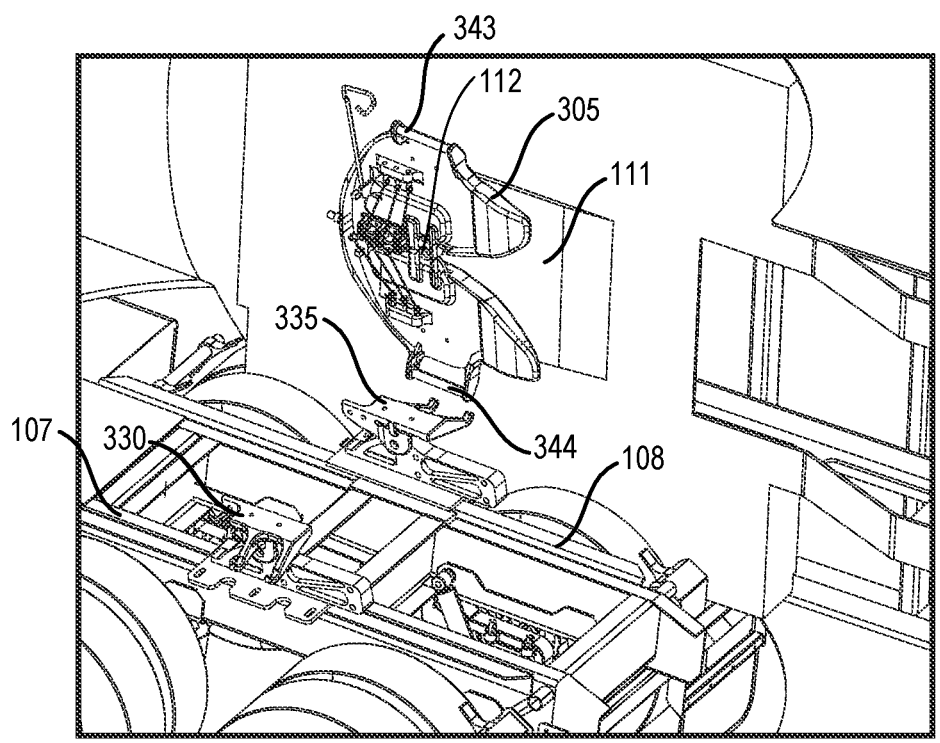
FIG. 28 shows an enlarged view of the breakaway fifth wheel coupling of FIG. 26 during the rollover event.

A second example of a breakaway fifth wheel coupling 300 is shown in FIGS. 26-33. The breakaway fifth wheel coupling 300 may have a dual pivot rail configuration. FIGS. 27 and 28 show a semi-truck with the breakaway fifth wheel coupling 300 as the trailer 110 is rolling over due to strong crosswinds. Unlike the semi-truck shown in FIG. 4, in the example of FIG. 27, only the trailer 110 rolls over. The breakaway fifth wheel coupling 300 allows the tractor 105 to decouple from the trailer 110 and remain upright. The tractor 105 can then move away from the rolled trailer 110 to clear the roadway and mitigate traffic disruption and provide room for emergency assistance vehicles and personnel to access the trailer wreckage.

The breakaway fifth wheel coupling 300 may include a top plate 305, as shown in FIG. 26. The top plate 305 may have a top side 306 and a bottom side 308. The top side 306 may have a top surface 307 configured to support the trailer skid plate 111. The top plate 305 may have a throat opening 315 configured to receive the trailer king pin 112 extending downward from the trailer skid plate 111.

A king pin latching mechanism 320 may be located near the central throat opening 315 and be configured to secure the trailer king pin 112. The king pin latching mechanism 320 may include a lock jaw 321, a tension spring, a lock bar, a release arm 324, and a release handle 336. The lock jaw 321 may be located within the throat opening 315 and be configured to secure the king pin 112 during coupling of the trailer 110 to the tractor 105.

Figure 29:
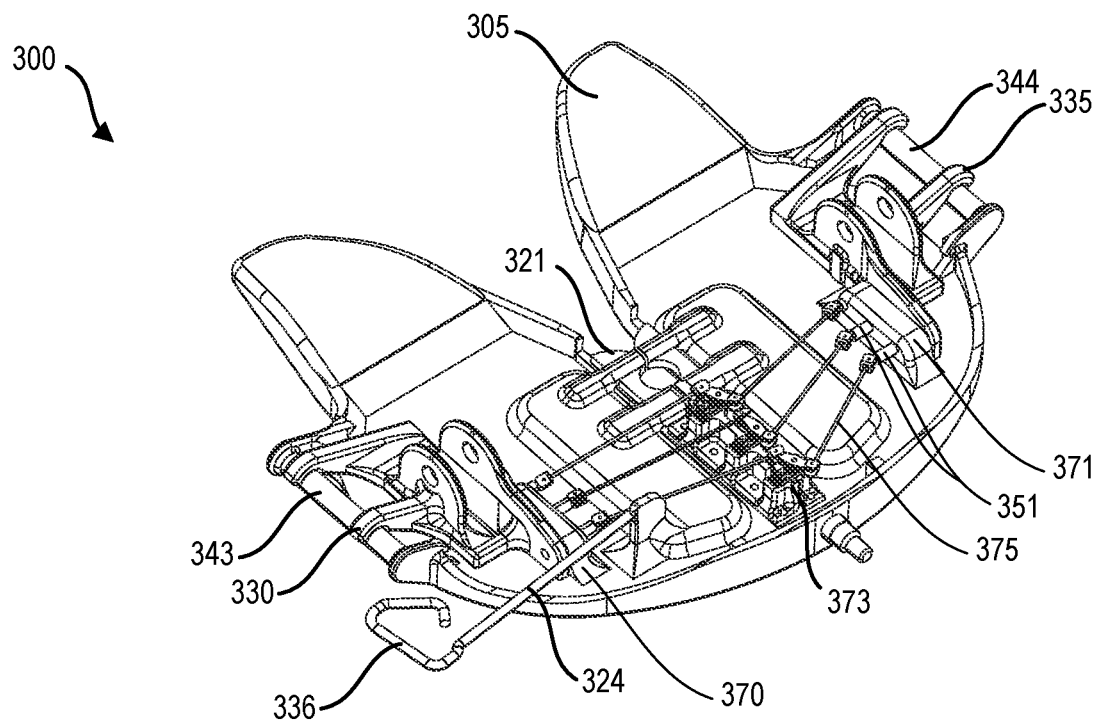
FIG. 29 shows a bottom perspective view of the breakaway fifth wheel coupling of FIG. 26.
Figure 30:
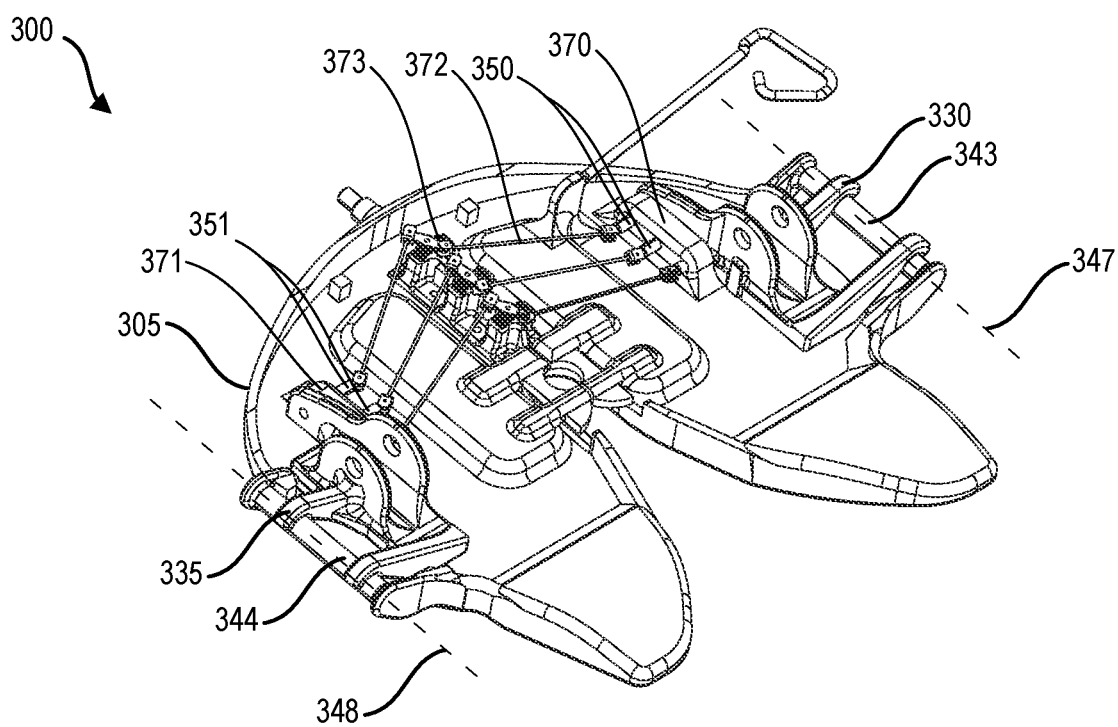
FIG. 30 shows a bottom perspective view of the breakaway fifth wheel coupling of FIG. 26.

The top plate 305 may include a first pivot rail 343 and a second pivot rail 344, as shown in FIGS. 26, 29, and 30. The first pivot rail 343 may be located near a left side perimeter of the top plate 305. The second pivot rail 344 may be located near a right side perimeter of the top plate 305. The first pivot rail 343 may be oriented in a front-to-rear direction alongside the top plate 305. The second pivot rail 344 may be oriented in a front-to-rear direction alongside the top plate 305.

The first pivot rail 343 may have a first pivot axis 347. The second pivot rail 344 may have a second pivot axis 348. The first pivot axis 347 and second pivot axis 348 may be substantially parallel. The first pivot axis 347 and second pivot axis 348 may be located on a horizontal plane. The first pivot axis 347 and second pivot axis 348 may be located above a mounting plane where the fifth wheel coupling 300 is configured to mount to the tractor chassis 106.

It may be desirable to position the first pivot axis 347 and the second pivot axis 348 relatively high in the breakaway fifth wheel coupling 300 to improve release performance of the coupling 300. In one example, a minimum distance between the top surface 307 of the top plate 305 and the first pivot axis 347 may be less than 25% of a minimum distance between the top surface 307 of the top plate 305 and a mounting plane. In another example, a minimum distance between the top surface 307 of the top plate 305 and the first pivot axis 347 may be less than 10% of a minimum distance between the top surface 307 of the top plate 305 and the mounting plane. Minimizing the distance between the top surface 307 of the top plate 305 and a horizontal plane that contains the first pivot axis 347 and the second pivot axis 348 may improve release performance by promoting a consistent pivoting motion about the first or second pivot axis.

It may be desirable to position the first pivot axis 347 and the second pivot axis 348 relatively far apart in the breakaway fifth wheel coupling 300 to improve release performance of the coupling 300. In one example, the distance between the first pivot axis 347 and the second pivot axis 248 may be at least 75% of a maximum width of the top plate 305. In another example, the distance between the first pivot axis 347 and the second pivot axis 348 may be at least 75% of a maximum width of the top plate 305. As shown in FIG. 26, the first pivot rail 343 and the second pivot rail 344 may extend beyond a perimeter 317 of the top plate 305, effectively maximizing the distance between the first and second pivot rails.

Figure 31:
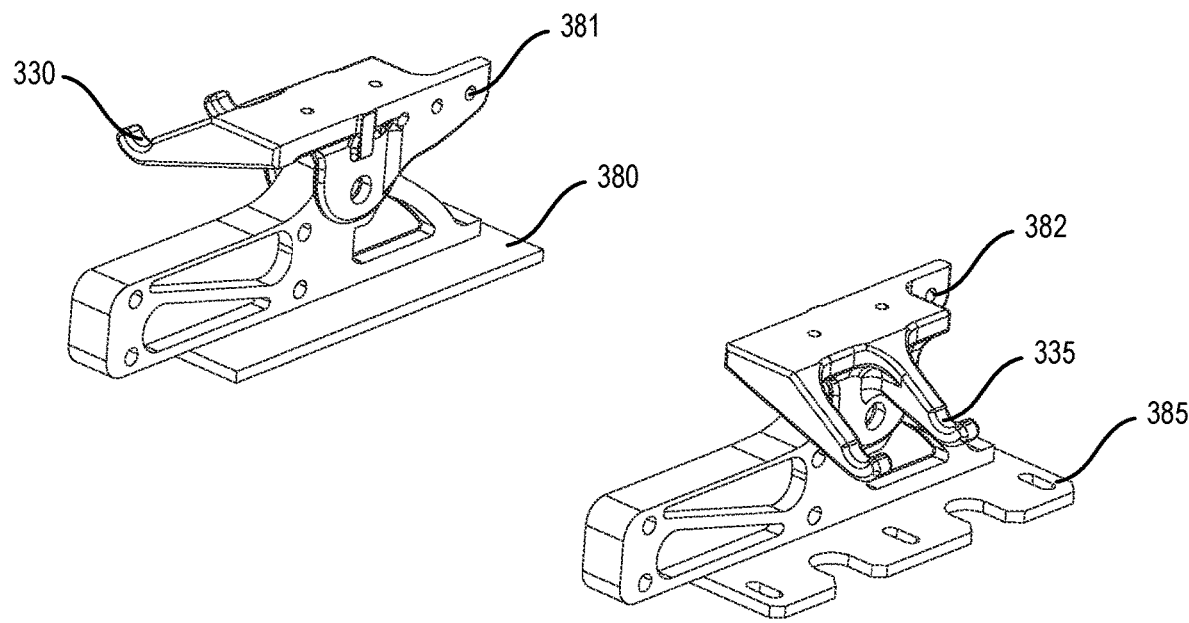
FIG. 31 shows a top perspective view of a pair of pivot cradle brackets positioned on a pair of mounting brackets of the fifth wheel coupling of FIG. 26.

The fifth wheel coupling 300 may include a mounting assembly. The mounting assembly may be configured to mount to the tractor chassis 106. The mounting assembly may be configured to receive and support the top plate 305. The mounting assembly may include a first pivot cradle bracket 330 and a second pivot cradle bracket 335, as shown in FIG. 31. The first pivot cradle bracket 330 may be configured to receive and support the first pivot rail 343, as shown in FIG. 26. Similarly, the second pivot cradle bracket 335 may be configured to receive and support the second pivot rail 344.

Figure 32:
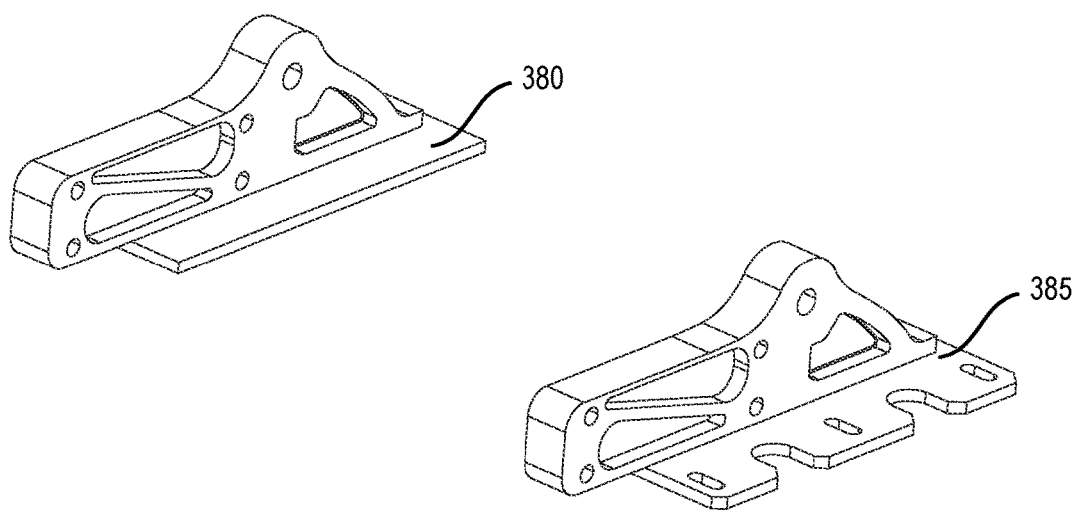
FIG. 32 shows a top perspective view of the pair of mounting brackets of the breakaway fifth wheel coupling of FIG. 26.
Figure 33:
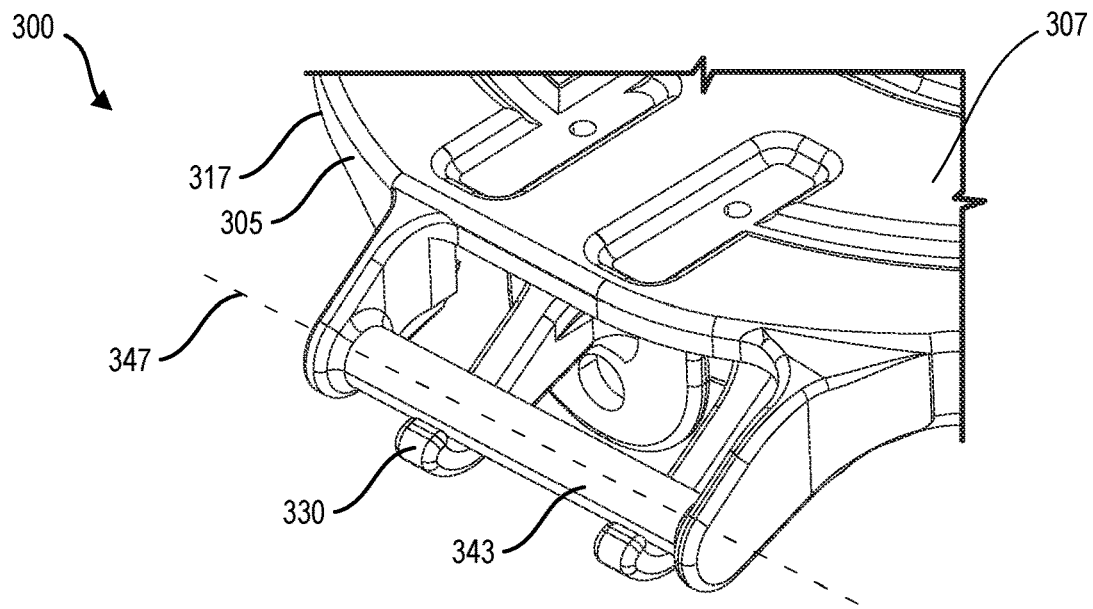
FIG. 33 shows a side perspective view of the breakaway fifth wheel assembly of FIG. 26.

The mounting assembly may include a first mounting bracket 380 and a second mounting bracket 385, as shown in FIGS. 31 and 32. The first and second mounting brackets may mount to the tractor chassis 106 and serve as a supportive base for the breakaway fifth wheel coupling 200. The mounting plane may be formed between a bottom surface of the first and second mounting brackets and the tractor chassis 106.

The breakaway fifth wheel coupling 200 may include a release mechanism. The release mechanism may allow the top plate 305 to rapidly detach from the mounting assembly during a trailer rollover scenario. The release mechanism may include a plurality of breakaway fasteners. In one embodiment, the plurality of breakaway fasteners may be a plurality of shear pins 350, as shown in FIGS. 29 and 30, that when sheared or withdrawn from their respective holes, allow the top plate 305 to rapidly detach from the mounting assembly.

The release mechanism may include a first plurality of shear pins 350 and a second plurality of shear pins 351. The first plurality of shear pins 350 may be inserted into respective holes in a first shear pin block 370 proximate to the first pivot rail 343. The second plurality of shear pins 351 may be inserted into respective holes in a second shear pin block 371 proximate to the second pivot rail 344. In the embodiment shown, the shear pin blocks may be integral to the top plate 305. In another example, the shear pin blocks may be integral to the mounting assembly. The first plurality of shear pins 350 may pass through holes in the first shear pin block 370 and into corresponding holes 381 in the first pivot cradle bracket 330. The second plurality of shear pins 351 may pass through holes in the second shear pin block 371 and into corresponding holes 382 in the second pivot cradle bracket 335.

In one example, the release mechanism may be a passive release system. In another example, the release mechanism may be an active release mechanism that is electronically controlled. In yet another example, the release mechanism may include a combination of passive and active elements (e.g., a combination of passive shear pins and actively controlled shear pins).

A passive release mechanism may be a passive mechanical device. The passive release mechanism may include one or more shear pins that pass through a portion of the top plate 205 and mounting bracket and serve as breakaway fasteners. During a rollover event, the rolling trailer 110 may cause a shear stress to be exerted on the shear pins. Upon reaching a predetermined threshold shear stress, the shear pins may shear, allowing the top plate 305 to decouple from the mounting assembly, effectively freeing the tractor 105 from the trailer 110.

An active release mechanism may be electronically controlled. The active release mechanism may include an electronic control unit (ECU) connected to one or more sensors. The sensors may include, for example, an accelerometer, a strain gauge, a load cell, and/or an inertial measurement unit. The inertial measurement unit may be capable of determining roll, yaw, and/or pitch. The sensors may include redundant sensors. In one example, the sensors may be positioned on the tractor 105. In another example, the sensors may be positioned on the trailer 110. In another example, the sensors may be positioned on the tractor and the trailer. In another example, the sensors may be positioned on the fifth wheel coupling 300. The ECU may contain control logic that receives data from the one or more sensors and determines one or more variables, such as orientation of the tractor and trailer, speed of travel, and/or state of the breakaway fifth wheel coupling 300. Based on the one or more determinations, the ECU may decide whether to actively withdraw the shear pins 350 to release the top plate 305.

The active release mechanism may include one or more servo motors 373. Each servo motor 373 may be connected to one or more of the shear pins by a tie-rod 372. Upon detection of an impending rollover event, the ECU may instruct the one or more servo motors 373 to withdraw the shear pins 350, thereby decoupling the top plate 305 from the mounting assembly.

Although some scenarios may require decoupling the trailer, other situations, such as when crosswinds become progressively stronger, may provide an opportunity to avoid decoupling the trailer by simply having the driver pull over, slow down, or select an alternate route. During operation, the ECU may convey sensor data to the driver and provide warning alerts if threshold values are in jeopardy of being exceeded. For example, a dashboard display may notify the driver that strong crosswinds have been detected and may instruct the driver to pull over, slow down, or select an alternate route.

The breakaway fifth wheel coupling 300 may include a docking assist device. The docking assist device may be configured to determine if the king pin 112 has been properly latched and prevent the tractor 105 from proceeding if the king pin 112 is improperly latched. The docking assist device may include one or more cameras. For example, the docking assist device may include a rearward facing camera 360 that allows a driver to view an approaching king pin 112 while backing the tractor 105 toward the king pin 112, as show in FIG. 26. The docking assist device may have a side facing camera 361 that allows a driver to visually verify that the lock jaw is positively coupled with the king pin, as show in FIG. 26.

The docking assist device may include one or more strain gauges 362, as shown in FIG. 26. The automatic docking mechanism may be configured to receive data from the one or more cameras and/or strain gauges and determine if positive latching of the king pin has occurred.

The docking assist device may include a display screen that allows video from the one or more cameras to be viewed live. The display screen may be located in a cab or embedded in a side mirror of the truck. Docking determination information may be presented on the display screen.

The docking assist device may include a transmitting device. The transmitting device may be configured to upload docking determination information and/or data acquired from camera images and/or strain gauges to a remote server.

The docking assist device may monitor latch health based on inputs such as, for example, trailer load, operating duration, and seasonal weather and road conditions. The docking assist device may alert the driver when the health of the latch falls below a lower acceptable threshold.

Figure 34:
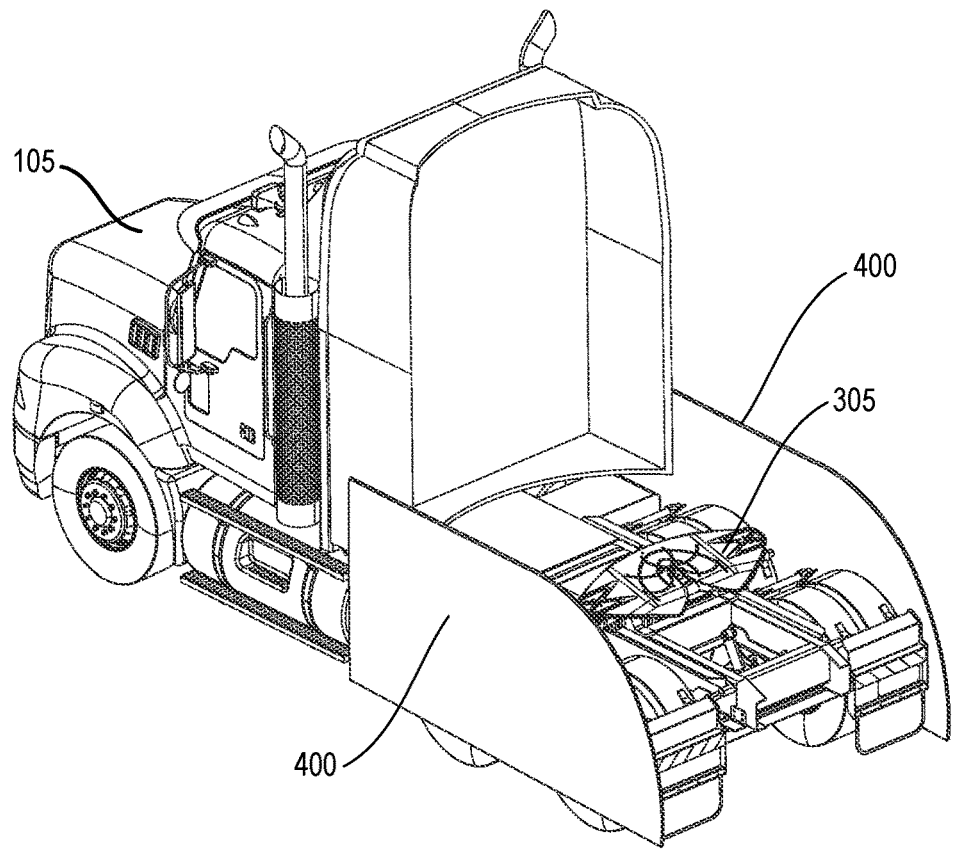
FIG. 34 shows a rear perspective view of a semi-tractor with a pair of aerodynamic drive axle fairing assemblies.
Figure 35:
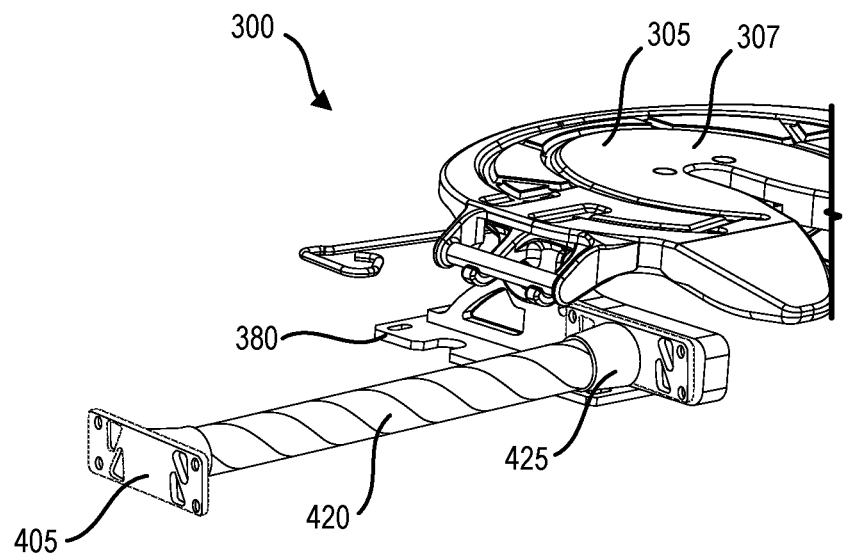
FIG. 35 shows a side perspective view a fairing mount of the aerodynamic drive axle fairing assembly of FIG. 34.
Figure 36:
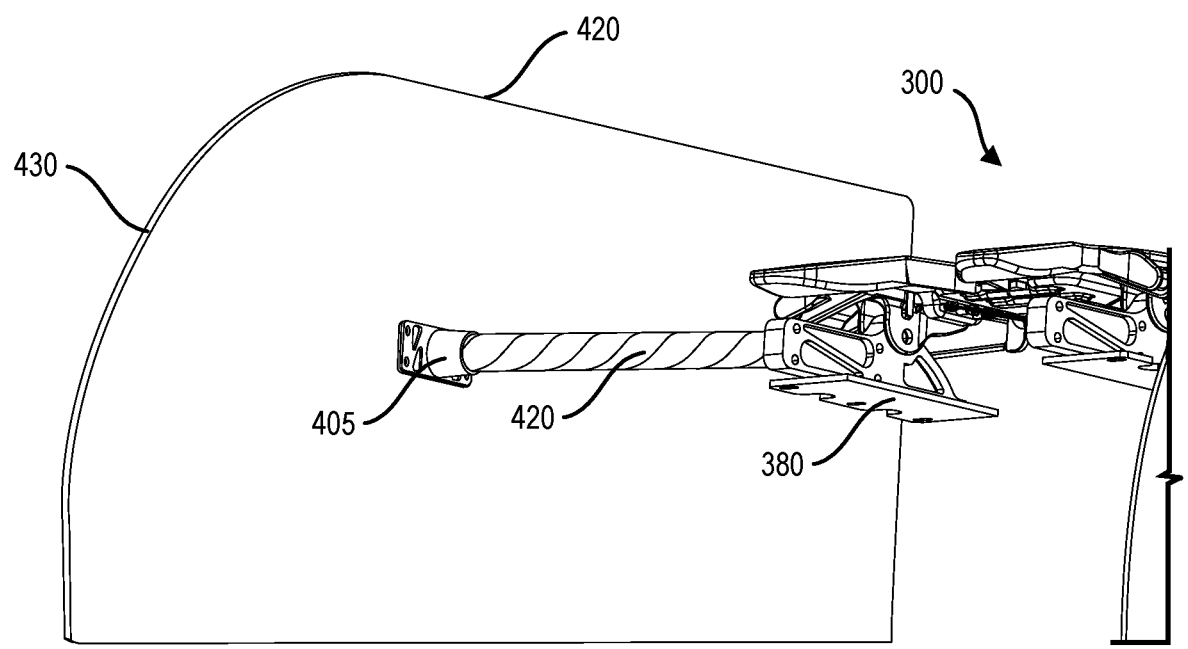
FIG. 36 shows a rear perspective view of the aerodynamic drive axle fairing assembly of FIG. 34.
Figure 37:
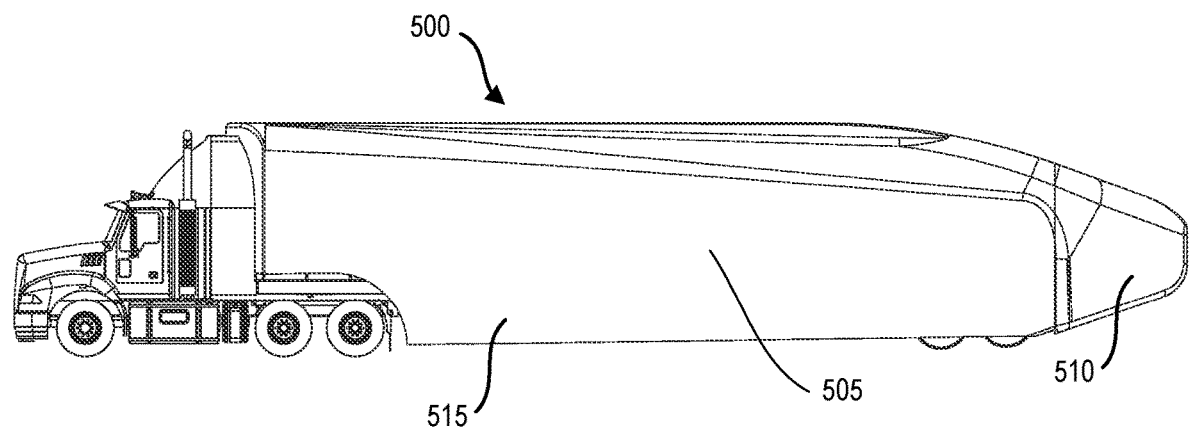
FIG. 37 shows a side view of an aerodynamic trailer.
Figure 38:
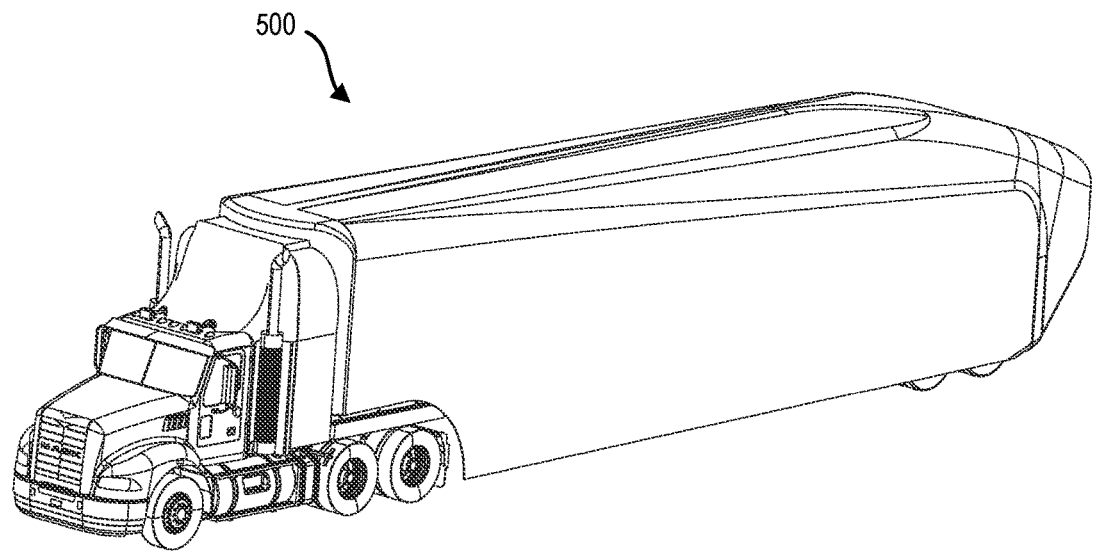
FIG. 38 shows a front perspective view of the aerodynamic trailer of FIG. 37.
Figure 39:
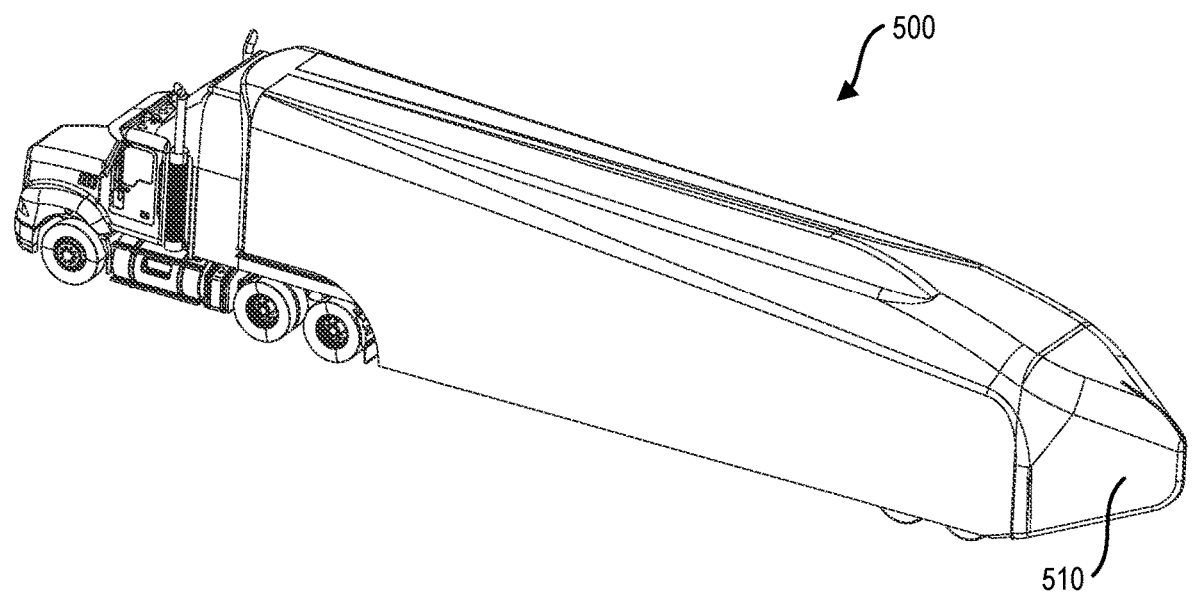
FIG. 39 shows a rear perspective view of the aerodynamic trailer of FIG. 37.
Figure 40:
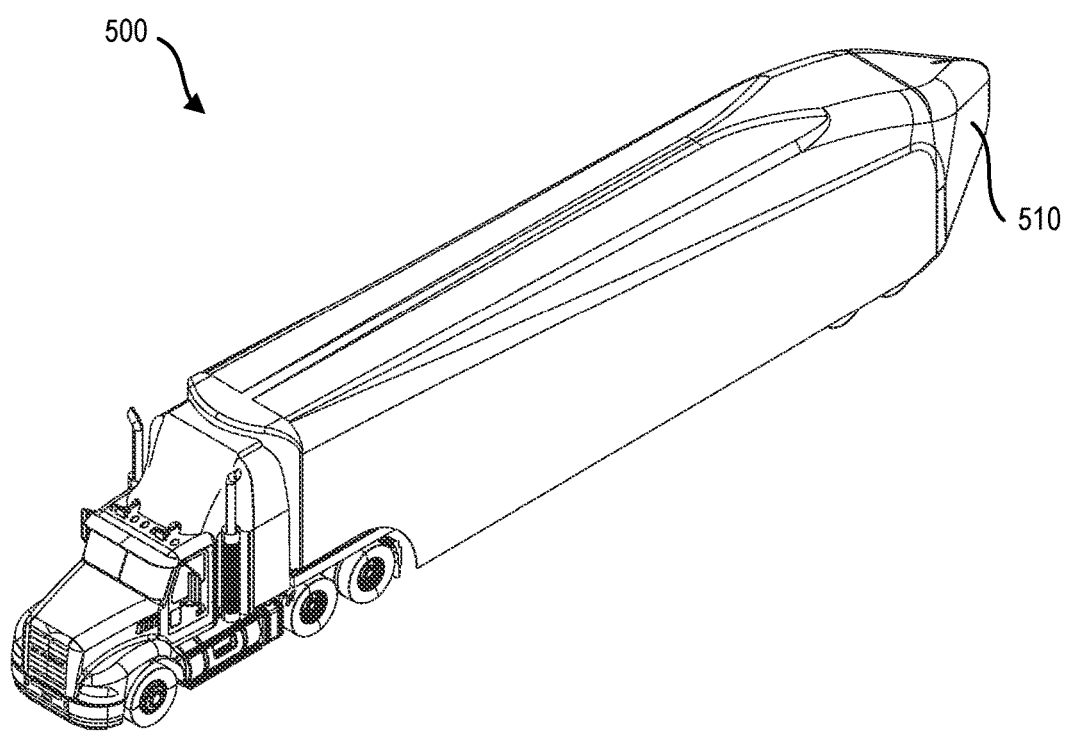
FIG. 40 shows a top perspective view of the aerodynamic trailer of FIG. 37.
Figure 41:
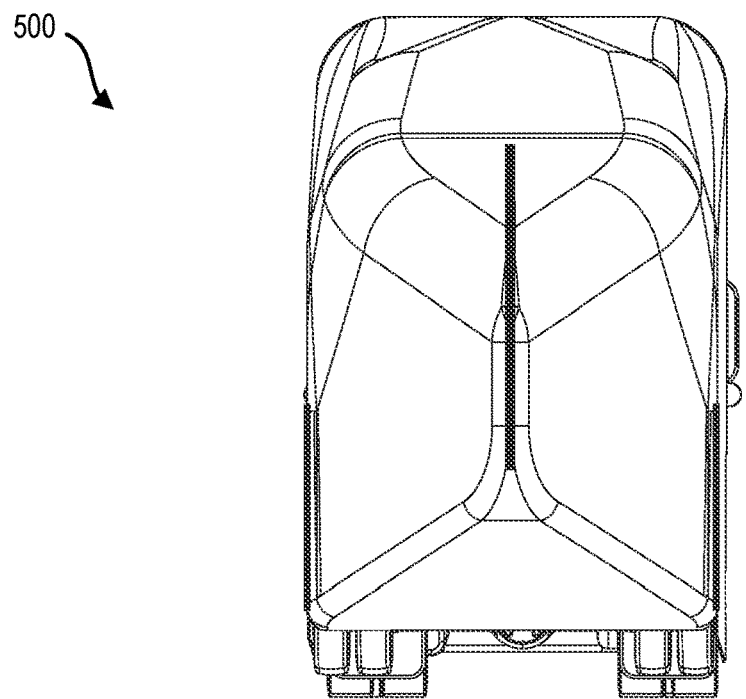
FIG. 41 shows a rear view of the aerodynamic trailer of FIG. 37.

A pair of aerodynamic drive axle fairings 400 are shown in FIG. 34. The drive axle fairings 400 may reduce drag and improve fuel economy. The drive axle fairings 400 may mount to the fifth wheel coupling 300, as shown in FIG. 35. Each drive axle fairing may include a fairing mount 405, a structural beam 420, and a structural beam mount 425, as shown in FIGS. 35 and 36. The structural beam 410 may extend from the structural beam mount 415 to the fairing mount 405 and be configured to support the aerodynamic drive axle fairing at highway speeds. The aerodynamic drive axle fairing 400 may have a contoured trailing edge 430 to reduce drag force.

An aerodynamic trailer 500 is shown in FIGS. 37-42. The aerodynamic trailer 500 may reduce drag and improve fuel economy. The aerodynamic trailer 500 may include a cargo section 505, a tail cone section 510, and a trailer skirt 515. The aerodynamic trailer 500 may be tapered from front to rear. The aerodynamic trailer 500 may be tapered from top to bottom. The tail cone section 510 may include converging side surfaces.

Figure 42:
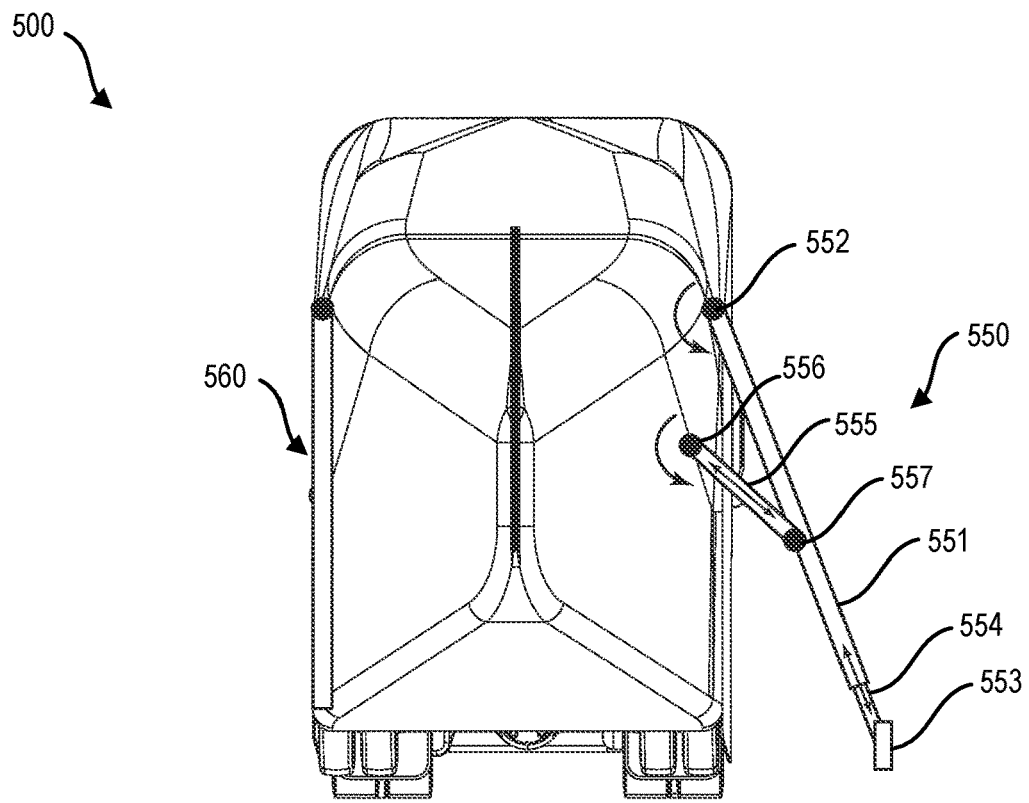
FIG. 42 shows a rear view of the semi-trailer of FIG. 37 with deployable anti-rollover legs.

FIG. 42 shows a semi-trailer with anti-rollover legs. The trailer 500 may include at least one anti-rollover leg 550 on a left side of the trailer. The trailer 500 may include at least one anti-rollover leg 560 on a right side of the trailer. The anti-rollover legs may be located near a rear end of the trailer. Each anti-rollover leg may remain in a stowed position during normal use of the trailer (e.g., when the trailer is being towed by a tractor). When a trailer rollover is detected, the legs may automatically deploy. The legs may be configured to contact the roadway to prevent the trailer 500 from tipping onto its side and thereby mitigate physical damage to the trailer and its contents.

In some situations (e.g., while operating the semi-truck 100 on a busy roadway), it may be desirable to bring the trailer 110 to a controlled stop before releasing it from the tractor 105. During a trailer rollover event, the top plate 205 may transition from being coupled to the bottom brace 240 to being partially decoupled from the bottom brace 240.

Prior to the rollover event, the top plate 205 is coupled to the bottom brace 240. When the trailer 110 initiates a rollover, the first release mechanism 250 may lift off of the first pivot rail 243, as shown in FIGS. 6 and 7. The anti-rollover leg 550 may deploy to stabilize the partially rolled trailer 110. The tractor 105 may then slow or come to a controlled stop before the second release mechanism 260 is actuated to release the second pivot rail 244, thereby allowing the top plate 205 to fully decouple from the bottom brace 240 and allowing the tractor 105 to fully separate from the trailer 110. The tractor 105 may then move a safe distance away from the rolled trailer 110, as shown in FIG. 8.

Each anti-rollover leg may include a primary member 551. The primary member 551 may have a first end attached to a first pivot joint 552 near an upper portion of the trailer. The primary member 551 may have a second end attached to a wheel 553 configured to engage a roadway surface. The primary member 551 may include an extendable portion 554 that extends when the leg is deployed to increase a distance between the wheel 553 and the first pivot joint 552. The extendable portion 554 may be a telescoping member as shown in FIG. 42. The primary member 551 may include a spring-loaded actuator to facilitate rapid extension of the wheel 553 during a rollover event.

Each anti-rollover leg include a secondary member 555. The secondary member 555 may have a first end attached to a second pivot joint 556 located below the first pivot joint on the trailer, as shown in FIG. 30. The secondary member 555 may have a second end attached to a third pivot joint 557 located along the primary member. The secondary member may support the primary member. The secondary member may include a spring-loaded actuator to facilitate rapid deployment of the anti-rollover leg by applying an outward force at the third pivot joint.

The anti-rollover legs may include an electronic control system. The electronic control system may include an inertial measurement unit (IMU). The IMU may measure a roll angle of the trailer 110 whenever the trailer is being hauled (i.e., in motion). If the roll angle exceeds a predetermined angle, the anti-rollover leg on the tipping side may be deployed.

Figure 43:
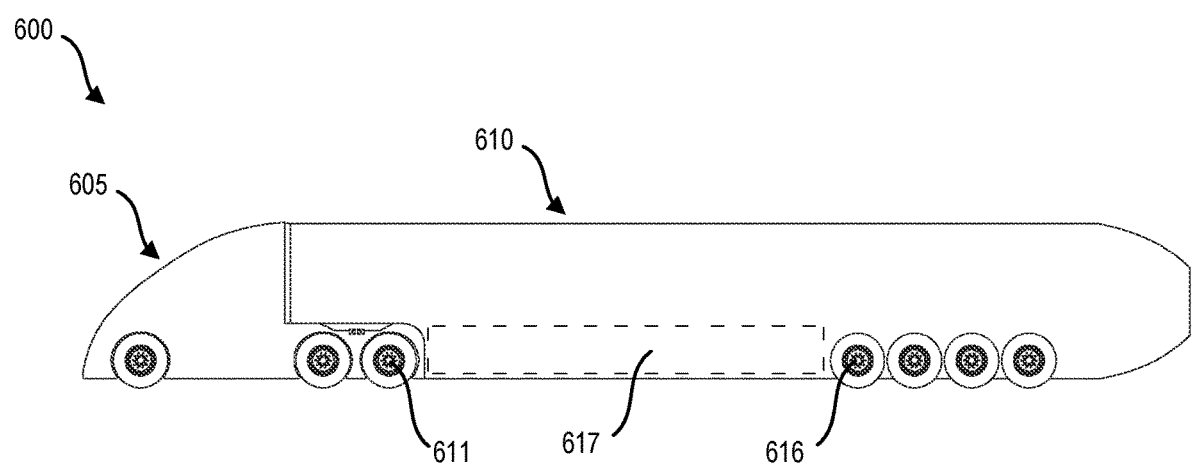
FIG. 43 shows a side view of an aerodynamic semi-tractor and an aerodynamic semi-trailer.

FIG. 43 shows an aerodynamic semi-truck 600 with an aerodynamic tractor 605 and an aerodynamic trailer 610. Air gaps between the tractor 605 and trailer 610 may be less than 1 inch to reduce aerodynamic drag. The trailer 610 may have more than two trailer axles. For example, the trailer may have four axles, as shown in FIG. 43. Consequently, the trailer 610 may have a plurality of wheels on either side of the trailer. The wheels may be arranged in a row and in close proximity to each other to reduce drag force. The wheels may be recessed into the trailer body to reduce drag force. The area between a rearmost tractor drive axle 611 and forwardmost trailer axle 616, which is open and not utilized on conventional trailers, may be enclosed and usable as additional cargo space 617. Consequently, a height of the trailer 610 can be decreased while maintaining an interior trailer volume that is comparable to conventional trailers. By lowering the overall height, the frontal area of the tractor can be decreased, thereby reducing drag force and improving aerodynamic performance and reducing fuel consumption.

The elements and method steps described herein can be used in any combination whether explicitly described or not. All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of 1-10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

As used herein, term "connected to" can describe a first component directly connected to a second component or a first component indirectly connected to a second component by way of one or more intervening components.

The methods and compositions of the present invention can comprise, consist of, or consist essentially of the essential elements and limitations described herein, as well as any additional or optional steps, components, or limitations described herein or otherwise useful in the art.

It is understood that the invention is not confined to the particular construction and arrangement of parts herein illustrated and described, but embraces such modified forms thereof as come within the scope of the claims.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A breakaway fifth wheel coupling comprising:
    a bottom brace comprising a front portion, a rear portion, a left side portion, a right side portion, a first pivot rail located on the left side portion and oriented in a front-to-rear direction, and a second pivot rail located on the right side portion and oriented in a front-to-rear direction, wherein a first pivot axis of the first pivot rail is substantially parallel to a second pivot axis of the second pivot rail;
    a top plate comprising a top surface and a bottom surface;
    a first release mechanism mounted to the bottom surface of the top plate, the first release mechanism configured to clamp onto and unclamp from the first pivot rail;
    a second release mechanism mounted to the bottom surface of the top plate, the second release mechanism configured to clamp onto and unclamp from the second pivot rail;
    a first actuator mounted to the bottom brace, wherein the first actuator is configured to actuate the first release mechanism; and a second actuator mounted to the bottom brace, wherein the second actuator is configured to actuate the second release mechanism, wherein the top plate is configured to pivot off of the bottom brace by rotating about the first pivot axis or the second pivot axis during a trailer rollover event.

2. The breakaway fifth wheel coupling of claim 1, wherein the first pivot axis and the second pivot axis are located on a horizontal plane.

3. The breakaway fifth wheel coupling of claim 1, wherein a distance between the first pivot axis and the second pivot axis is at least 90% of a maximum width of the top plate.

4. The breakaway fifth wheel coupling of claim 1, wherein the first actuator is mounted to a bottom surface of the bottom brace, the bottom brace comprising a first opening through which a first piston rod of the first actuator is configured to travel along a first deployment pathway to actuate the first release mechanism.

5. The breakaway fifth wheel coupling of claim 1, further comprising a first pocket in a top surface of the left side portion of the bottom brace, at least a portion of the first release mechanism occupying the first pocket when the first release mechanism is clamped onto the first pivot rail and the second release mechanism is clamped onto the second pivot rail.

6. The breakaway fifth wheel coupling of claim 1, wherein actuating the first release mechanism and the second release mechanism decouples the top plate from the bottom brace by unclamping the first release mechanism from the first pivot rail and unclamping the second release mechanism from the second pivot rail.

7. The breakaway fifth wheel coupling of claim 1, wherein the first actuator is a pyrotechnic linear actuator.

8. A breakaway fifth wheel coupling comprising:
a top plate comprising a top surface and a bottom surface;
a first release mechanism attached to the bottom surface of the top plate, the first release mechanism comprising a first clamp portion that can be opened and closed by actuating a first moment arm of the first release mechanism;
a second release mechanism attached to the bottom surface of the top plate, the second release mechanism comprising a second clamp portion that can be opened and closed by actuating a second moment arm of the second release mechanism;
a bottom brace having a front portion, a rear portion, a left side portion, a right side portion, a top portion, a bottom portion, a first pivot rail located on the left side portion, and a second pivot rail located on the right side portion, the first pivot rail extending from the front portion to the rear portion, the second pivot rail extending from the front portion to the rear portion, wherein a first pivot axis of the first pivot rail is substantially parallel to a second pivot axis of the second pivot rail, and wherein the first pivot axis and the second pivot axis are located on a first horizontal plane that is above a mounting plane;
a first linear actuator attached to the left side portion of the bottom brace, the first linear actuator comprising a first piston rod configured to deploy along a first vertical deployment pathway that intersects the first moment arm; and
a second linear actuator attached to the right side portion of the bottom brace, the second linear actuator comprising a second piston rod configured to deploy along a second vertical deployment pathway that intersects the second moment arm, wherein the first release mechanism is configured to clamp onto the first pivot rail, and the second release mechanism is configured to clamp onto the second pivot rail, and wherein actuating the first linear actuator during a rollover event causes the first release mechanism to open and release the first pivot rail, and wherein actuating the second linear actuator during a rollover event causes the second release mechanism to open and release the second pivot rail.

9. The breakaway fifth wheel coupling of claim 8, wherein the first linear actuator is attached to the bottom surface of the bottom brace, and wherein the first vertical deployment pathway passes through a first opening in the left side portion of the bottom brace.

10. The breakaway fifth wheel coupling of claim 8, wherein the first release mechanism comprises an over-center linkage assembly.

11. The breakaway fifth wheel coupling of claim 8, wherein the bottom brace further comprises a first pivot joint located on the left side portion of the bottom portion of the bottom brace, and a second pivot joint located on the right side portion of the bottom portion of the bottom brace, the first pivot joint having a first joint axis, the second pivot joint having a second joint axis, the first joint axis and the second joint axis being located on a second horizontal plane, wherein the second horizontal plane is located closer to a ground plane than the first horizontal plane is located to the ground plane.

12. The breakaway fifth wheel coupling of claim 8, wherein the first release mechanism comprises a body portion, a clamp portion attached to the body portion by a first pivot pin, a linkage having a first end connected to the clamp portion by a second pivot pin and a second end connected to a moment arm by a third pivot pin, the moment arm being connected to the body portion by a fourth pivot pin.

13. The breakaway fifth wheel coupling of claim 8, wherein the top plate comprises a throat opening extending from a rear portion of the top plate to a central portion of the top plate and a king pin latching mechanism proximate to the throat opening.

14. The breakaway fifth wheel coupling of claim 8, further comprising:
a first mounting bracket configured to mount to a left chassis rail a semi-truck, the first mounting bracket attached to a first pivot joint on the bottom surface of the left side portion of the bottom brace; and
a second mounting bracket configured to mount to a right chassis rail of the semi-truck, the second mounting bracket attached to a second pivot joint on the bottom surface of the left side portion of the bottom brace,
wherein a minimum distance between the first pivot rail and the second pivot rail is greater than a minimum distance between the first mounting bracket and the second mounting bracket.

15. The breakaway fifth wheel coupling of claim 8, further comprising:
a first mounting bracket configured to mount to a left chassis rail a semi-truck, the first mounting bracket attached to a first pivot joint on the bottom surface of the left side portion of the bottom brace; and
a second mounting bracket configured to mount to a right chassis rail of the semi-truck, the second mounting bracket attached to a second pivot joint on the bottom surface of the left side portion of the bottom brace, wherein the first pivot rail is located farther from a vertical midplane of the bottom brace than the first mounting bracket is located from the vertical midplane, and wherein the second pivot rail is located farther from the vertical midplane of the bottom brace than the second mounting bracket is located from the vertical midplane.

16. The breakaway fifth wheel coupling of claim 8, further comprising:
- a central throat opening in the top plate, the central throat opening configured to receive a trailer king pin;
- a king pin latching mechanism proximate to the central throat opening, the king pin latching mechanism comprising a lock jaw;
- a side facing camera located proximate to the king pin latching mechanism, the side facing camera configured to provide an image of the lock jaw;
- a rearward facing camera located proximate to the king pin latching mechanism, the rearward facing camera configured to provide an image of an approaching king pin; and
- a strain gauge on the lock jaw.

17. The breakaway fifth wheel coupling of claim 8, further comprising:
- a first mounting bracket attached to the bottom brace;
- a structural support having a first end and a second end, the first end being attached to the first mounting bracket, the second end extending outward from the first mounting bracket; and
- an axle fairing attached to the second end of the structural support, the axle fairing having a contoured trailing edge.

18. A breakaway fifth wheel coupling with dual pivot rails, the breakaway fifth wheel coupling comprising:
- a mounting assembly comprising a first mounting bracket configured to mount on a left side chassis rail of a semi-tractor, and a second mounting bracket configured to mount on a right side chassis rail of the semi-tractor;
- a bottom brace attached to the first mounting bracket and attached to the second mounting bracket, the bottom brace configured to be oriented substantially perpendicular to the left side chassis rail and substantially perpendicular to the right side chassis rail, the bottom brace serving as a cross member that extends from the first mounting bracket to the second mounting bracket;
- a first pivot rail attached to a left side portion of the bottom brace, a first pivot axis of the first pivot rail being substantially parallel to the left side chassis rail and located farther from a vertical midplane of the bottom brace than the first mounting bracket is located from the vertical midplane;
- a second pivot rail attached to a right side portion of the bottom brace, a second pivot axis of the second pivot rail being substantially parallel to the left side chassis rail and located farther from a vertical midplane of the bottom brace than the second mounting bracket is located from the vertical midplane;
- a top plate comprising a top surface and a bottom surface; and
- a release mechanism attached to the bottom surface of the top plate and configured to releasably attach the top plate to the bottom brace, the release mechanism comprising a first release mechanism configured to releasably clamp onto the first pivot rail and a second release mechanism configured to releasably clamp onto the second pivot rail,
- wherein actuating the release mechanism allows the top plate to decouple from the bottom brace by unclamping the first release mechanism from the first pivot rail and unclamping the second release mechanism from the second pivot rail.

19. The breakaway fifth wheel coupling of claim 18, wherein a minimum distance between the top surface of the top plate and the first pivot axis is less than 25% of a minimum distance between the top surface of the top plate and a mounting plane.

20. The breakaway fifth wheel coupling of claim 18, wherein the first release mechanism comprises:
- a body portion;
- a clamp portion configured to clamp the first pivot rail against the body portion; and
- a moment arm connected to the clamp portion by an over-center mechanical linkage,
- wherein the first release mechanism is actuated by depressing the moment arm which causes the clamp portion to release the first pivot rail.

* * * * *